US012317868B2

(12) United States Patent
Nestelbaum

(10) Patent No.: US 12,317,868 B2
(45) Date of Patent: Jun. 3, 2025

(54) METHODS, SYSTEMS, APPARATUSES, AND DEVICES FOR FACILITATING FEEDING OF ANIMALS

(71) Applicant: Freezbone Inc., Fort Lauderdale, FL (US)

(72) Inventor: Dan Nestelbaum, Fort Lauderdale, FL (US)

(73) Assignee: Freezbone, Fort Lauderdale, FL (US)

( * ) Notice: Subject to any disclaimer, the term of this patent is extended or adjusted under 35 U.S.C. 154(b) by 0 days.

(21) Appl. No.: 18/925,213

(22) Filed: Oct. 24, 2024

(65) Prior Publication Data

US 2025/0057114 A1 Feb. 20, 2025

Related U.S. Application Data

(63) Continuation of application No. PCT/US2023/030301, filed on Aug. 16, 2023.

(60) Provisional application No. 63/400,019, filed on Aug. 22, 2022.

(51) Int. Cl.
*A01K 5/01* (2006.01)

(52) U.S. Cl.
CPC .................................. *A01K 5/0114* (2013.01)

(58) Field of Classification Search
CPC .... A01K 5/0114; A01K 5/015; A01K 15/025; A01K 15/026
See application file for complete search history.

(56) References Cited

U.S. PATENT DOCUMENTS

| | | | | | |
|---|---|---|---|---|---|
| 3,990,455 | A * | 11/1976 | Panicci | A61J 17/109 606/235 |
| 4,513,014 | A * | 4/1985 | Edwards | A01K 15/026 119/710 |
| 5,595,142 | A * | 1/1997 | Chill | A01K 5/0114 119/710 |
| 9,107,390 | B1 * | 8/2015 | Day | A01K 15/026 |
| 9,585,368 | B2 * | 3/2017 | Gick | A01K 15/026 |
| 2008/0314331 | A1 * | 12/2008 | DeGhionno | A01K 5/0114 119/709 |
| 2011/0265732 | A1 * | 11/2011 | Lai | A01K 15/026 119/710 |
| 2013/0000564 | A1 * | 1/2013 | Beckhart | A01K 5/0114 119/710 |
| 2013/0340685 | A1 * | 12/2013 | Grepper | A01K 15/026 119/709 |

(Continued)

*Primary Examiner* — Ebony E Evans
(74) *Attorney, Agent, or Firm* — Dhiraj Jindal; PATENT YOGI LLC

(57) ABSTRACT

An apparatus for facilitating feeding of animals includes a body having a top side and a bottom side opposing the top side. The body includes an interior space and an opening leading into the interior space is disposed on the top side of the body. The interior space is fillable with a feed material by transferring the fillable material into the interior space through the opening. The body enhances heat transfer from the feed material to an exterior of the apparatus for freezing the feed material. The body is stably disposed on a surface for serving the feed material to an animal after the freezing. The body restricts heat transfer to the feed material from the exterior of the apparatus. The body allows a consumption of the feed material based on licking the feed material by the animal through the opening for facilitating the feeding of the animal.

18 Claims, 28 Drawing Sheets

(56) References Cited

U.S. PATENT DOCUMENTS

| | | | | |
|---|---|---|---|---|
| 2015/0334993 | A1* | 11/2015 | Roetheli | A61D 5/00 426/512 |
| 2019/0069521 | A1* | 3/2019 | Hutton | A63H 1/10 |
| 2022/0330524 | A1* | 10/2022 | Mattos | A01K 15/026 |
| 2025/0081938 | A1* | 3/2025 | Haarburger | A01K 15/026 |

* cited by examiner

METHODS, SYSTEMS, APPARATUSES, AND DEVICES FOR FACILITATING FEEDING OF ANIMALS

CROSS-REFERENCE TO RELATED APPLICATION

This application is a bypass application of International Application No. PCT PCT/US23/30301 filed on 16 Aug. 2023 and titled "METHODS, SYSTEMS, APPARATUSES, AND DEVICES FOR FACILITATING FEEDING OF ANIMALS" which in turn claims the benefit of U.S. Provisional Patent Application No. 63/400,019, titled "APPARATUSES AND DEVICES FOR FACILITATING FEEDING OF PETS", filed 22 Aug. 2022, which are incorporated by reference herein in its entirety.

FIELD OF THE INVENTION

Generally, the present disclosure relates to the field of animal husbandry. More specifically, the present disclosure relates to methods, systems, apparatuses, and devices for facilitating feeding of animals.

BACKGROUND OF THE INVENTION

Existing feeders for facilitating feeding of animals are deficient in regard to several aspects. Further, the current feeders are specifically designed with small holes and the pets feed on feed material coming out through that holes which creates a mess. As a result, different feeders are needed which reduces the mess. Further, the current feeders are specifically designed for two holes which makes refilling the feeders with the feed material difficult. As a result, different feeders are needed which provide easy refilling of the feed material. Further, the current feeders are specifically designed to allow pets to feed on the feed material quickly. As a result, different feeders are required that delay the feeding of the feed material by the pet.

Therefore, there is a need for improved methods, systems, apparatuses, and devices for facilitating feeding of animals that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is an apparatus for facilitating feeding of animals, in accordance with some embodiments. Accordingly, the apparatus may include a body having a top side and a bottom side opposing the top side. Further, the body may include at least one interior space and at least one opening leading into the at least one interior space. Further, the at least one opening may be disposed on the top side of the body. Further, the at least one interior space may be configured to be fillable with at least one feed material by transferring the at least one fillable material into the at least one interior space through the at least one opening. Further, the body may be configured for enhancing heat transfer from the at least one feed material filled in the at least one interior space to an exterior of the apparatus for freezing the at least one feed material. Further, the body may be configured to be stably disposed on a surface for serving the at least one feed material to at least one animal after the freezing of the at least one feed material. Further, the body may be configured for restricting heat transfer to the at least one feed material filled in the at least one interior space from the exterior of the apparatus. Further, the body may be configured for allowing a consumption of the at least one feed material based on licking the at least one feed material by the at least one animal through the at least one opening for the feeding of the at least one animal.

Further, disclosed herein is an apparatus for facilitating feeding of animals, in accordance with some embodiments. Accordingly, the apparatus may include a body having a top side and a bottom side opposing the top side. Further, the body may include at least one interior space and at least one opening leading into the at least one interior space. Further, the at least one opening may be disposed on the top side of the body. Further, the at least one interior space may be configured to be fillable with at least one feed material by transferring the at least one fillable material into the at least one interior space through the at least one opening. Further, the body may be configured for enhancing heat transfer from the at least one feed material filled in the at least one interior space to an exterior of the apparatus for freezing the at least one feed material. Further, the body may be configured to be stably disposed on a surface for serving the at least one feed material to at least one animal after the freezing of the at least one feed material. Further, the body may be configured for restricting heat transfer to the at least one feed material filled in the at least one interior space from the exterior of the apparatus. Further, the body may be configured for allowing a consumption of the at least one feed material based on licking of the at least one feed material by the at least one animal through the at least one opening for facilitating the feeding of the at least one animal. Further, the body may include an elongated portion and two lobes. Further, the elongated portion extends between a first end and a second end. Further, a first lobe of the two lobes may be attached to the first end and a second lobe of the two lobes may be attached to the second end. Further, the at least one interior space may include two interior spaces. Further, a first interior space of the two interior spaces may be comprised in the first lobe and a second interior space of the two interior spaces may be comprised in the second lobe. Further, the at least one opening may include two openings. Further, a first opening of the two openings may be comprised in the first lobe and a second opening of the two openings may be comprised in the second lobe.

Further, disclosed herein is an apparatus for facilitating feeding of animals, in accordance with some embodiments. Accordingly, the apparatus may include a body having a top side and a bottom side opposing the top side. Further, the body may include at least one interior space and at least one opening leading into the at least one interior space. Further, the at least one opening may be disposed on the top side of the body. Further, the at least one interior space may be configured to be fillable with at least one feed material by transferring the at least one fillable material into the at least one interior space through the at least one opening. Further, the body may be configured for enhancing heat transfer from the at least one feed material filled in the at least one interior space to an exterior of the apparatus for freezing the at least one feed material. Further, the body may be configured to be stably disposed on a surface for serving the at least one feed material to at least one animal after the freezing of the at least one feed material. Further, the body may include a bottom surface comprised on the bottom side of the body.

Further, the bottom surface may be a flat surface. Further, the bottom surface contacts the surface for stably disposing the apparatus on the surface. Further, the body may be configured for restricting heat transfer to the at least one feed material filled in the at least one interior space from the exterior of the apparatus. Further, the body may be configured for allowing a consumption of the at least one feed material based on licking of the at least one feed material by the at least one animal through the at least one opening for facilitating the feeding of the at least one animal.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
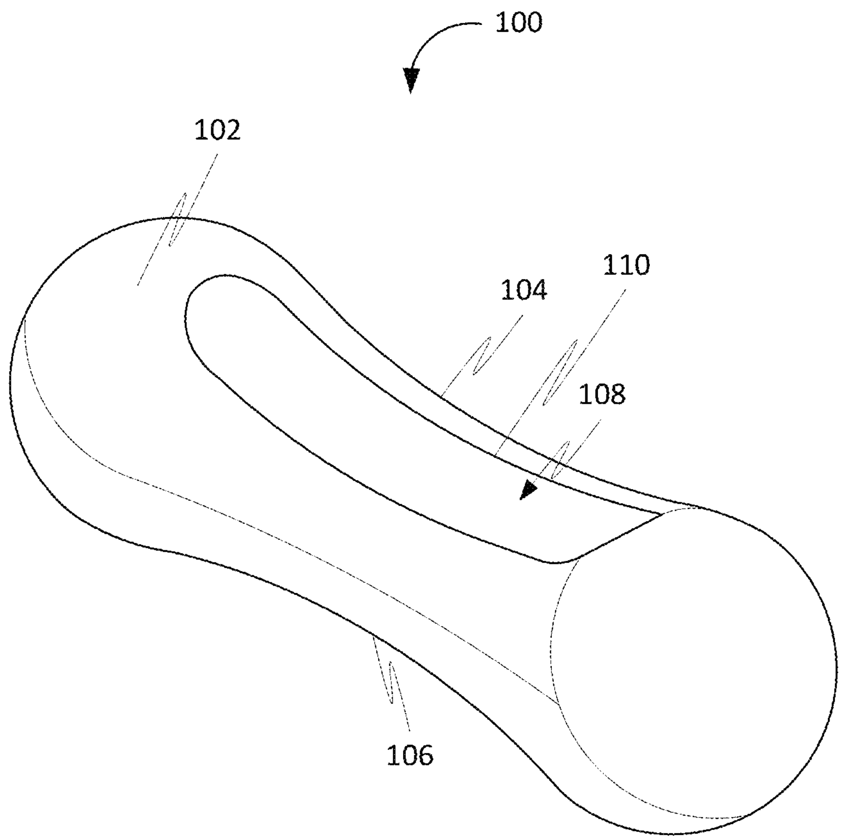
FIG. 1 is a top perspective view of an apparatus 100 for facilitating feeding of animals, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term-differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for facilitating feeding of animals, embodiments of the present disclosure are not limited to use only in this context.

Overview:

The present disclosure describes methods, systems, apparatuses, and devices for facilitating feeding of animals. Further, the animals may be pets such as dogs, cats, etc.

Further, the present disclosure describes a refillable bone for dogs that are meant to be frozen and then served to the dogs for a long-lasting chew.

Further, the refillable bone uses natural rubber for keeping enough space in an opening of the refillable bone for the dogs to lick and use the refillable bone for a long time. Further, the refillable bone may be designed as a half-empty bone creating an appearance of a bone. Further, the refillable bone may be easy to fill, easy to freeze, easy to serve, and easy to wash. Further, the refillable bone may be dishwasher safe.

Further, the refillable bone allows the dog to enjoy the bone for a long period of time. Further, long-lasting chewing of the refillable bone gets the pets tired, keep the pets busy for a long period of time, and calms the anxious pets down.

Further, the present disclosure describes fillers (feed material) for the refillable bone. Further, the fillers may be made up of healthy meats. Further, the fillers may be stored in a pouch and can be poured easily into the refillable bone from the pouch without any mess.

Further, the present disclosure describes a refillable bone. Further, the refillable bone may be made up of natural rubber. Further, the refillable bone may be ready to serve to the dogs after freezing the refillable bone in a freezer for 30 minutes. Further, the dogs may lick the refillable bone for a longer time than an average bone.

Further, the present disclosure describes an apparatus for facilitating feeding of a dog. Further, the apparatus resembles a broken bone having a single hole and a cavity in which fillers are filled. Further, the dog feeds on the fillers through the hole.

Further, the hole is larger than holes present on other feeders that are used for feeding the dog. Further, the larger hole allows the dog's tongue to easily lick the filler. Further, the larger hole allows the dog's tongue to easily go to the bottom of the cavity of the bone to completely lick out all the fillers present in the cavity as compared to other feeders which have smaller holes that do not allow the dog's tongue to go through it. Further, the larger hole allows easy filling of the cavity of the bone with filler. Further, the larger hole allows the filling of the cavity of the bone without any special equipment or device, contrary to the other feeders which require special equipment or devices for filling the feeders.

Further, the single hole also reduces the mess made during filling the cavity of the bone as there is little to no chance to spill the filler when filling it into the bone through one hole. Further, the single hole also reduces the mess made when the dog consumes the bone as the dog easily licks out the filler through the single hole and also since there aren't any other holes in the bone therefore the filler wouldn't leak out of the other holes preventing the mess while the bone is consumed. Further, the single hole allows the dog to focus on licking on side of the bone. Further, allowing the dog to focus on licking one side of the bone creates a goal for the dog to dig deep and finish the filler present inside the bone. Further, the dog while licking one side of the bone does not try to flip the bone or lick the bone from both sides, which means that the dog doesn't get distracted.

Further, the bone may be of different sizes, and the different sizes of the bones may have different sizes of holes. Further, the different sizes of the bones with different sizes of holes are easier to be used by different types or sizes of dogs.

Further, the shape of the bone makes it easy for the dog to hold it with their paws, and to consume what is inside the bone. The bone sits comfortably on its large base, which supports the bone when the dog starts consuming it.

Further, the bone stimulates a broken bone which makes the dog love the bone as the dog does not see this bone as a toy but as a regular bone.

Further, the bone is made from a unique formulation and natural rubber material that allows the bone to be frozen in the freezer without making it go bad.

Further, the dog is chewing on half of a long bone.

Further, the bone is very robust and makes it extremely tough for the dogs to chew on it.

FIG. 1 is a top perspective view of an apparatus 100 for facilitating feeding of animals, in accordance with some embodiments. Further, the apparatus 100 may include a body 102 having a top side 104 and a bottom side 106 opposing the top side 104. Further, the body 102 may include at least one interior space 108 and at least one opening 110 leading into the at least one interior space 108. Further, the at least one opening 110 may be disposed on the top side 104 of the body 102. Further, the at least one interior space 108 may be configured to be fillable with at least one feed material by transferring the at least one fillable material into the at least one interior space 108 through the at least one opening 110. Further, the body 102 may be configured for enhancing heat transfer from the at least one feed material filled in the at least one interior space 108 to an exterior of the apparatus 100 for freezing the at least one feed material. Further, the body 102 may be configured to be stably disposed on a surface for serving the at least one feed material to at least one animal after the freezing of the at least one feed material. Further, the body 102 may be configured for restricting heat transfer to the at least one feed material filled in the at least one interior space 108 from the exterior of the apparatus 100. Further, the body 102 may be configured for allowing a consumption of the at least one feed material based on licking of the at least one feed material by the at least one animal through the at least one opening 110 for facilitating the feeding of the at least one animal. Further, the at least one animal may include a pet animal such as a dog, a cat, etc. Further, the at least one feed material may be substances for feeding the at least one animal. Further, the apparatus 100 filled with the at least one feed material may be a treat on which the at least one animal feeds for facilitating the feeding of the at least one animal rather than a treat dispenser that dispenses the treat to the at least one animal.

Further, in some embodiments, the at least one opening 110 may be characterized by at least one opening size. Further, the at least one opening size may be substantially equal to at least one tongue size of the at least one animal. Further, the allowing of the consumption of the at least one feed material based on the licking of the at least one feed material by the at least one animal through the at least one opening 110 may be based on the at least one opening size of the at least one opening 110. Further, the at least one opening size of the at least one opening 110 provides the at least one animal an easy access to the at least one feed material filled in the at least one interior space 108, through the at least one opening 110.

Figure 2:
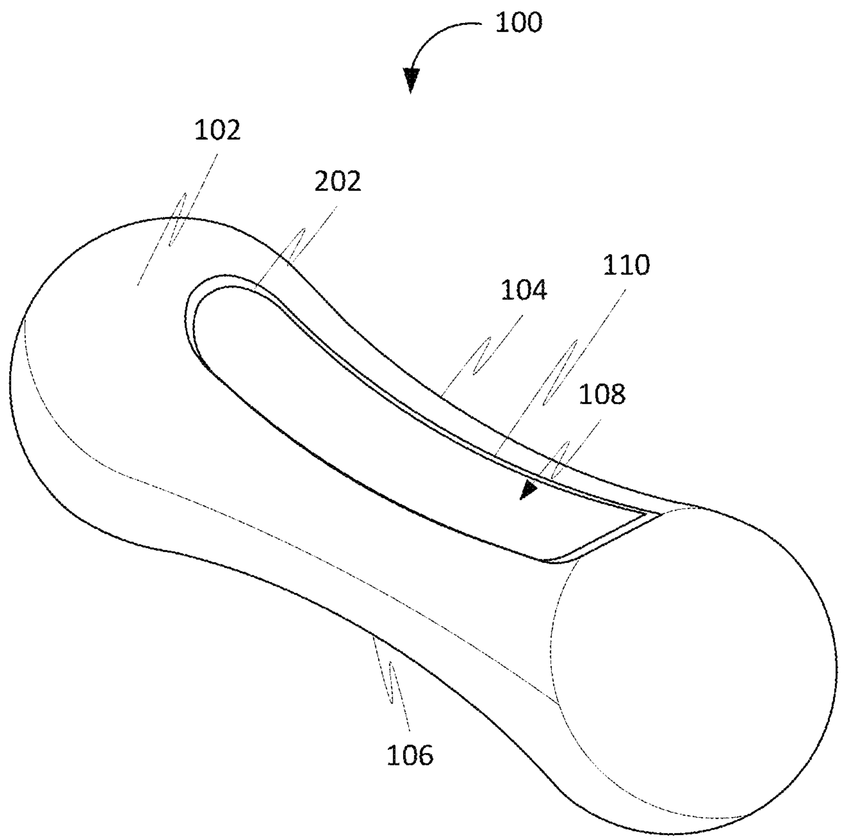
FIG. 2 is a top perspective view of the apparatus 100, in accordance with some embodiments.

Further, in some embodiments, the body 102 may include at least one interior surface defining the at least one interior space 108 and a layer of non stick material 202, as shown in FIG. 2, on the at least one interior surface. Further, the layer of non stick material 202 may include polytetrafluoroethylene (PTFE), Teflon, etc.

Figure 3:
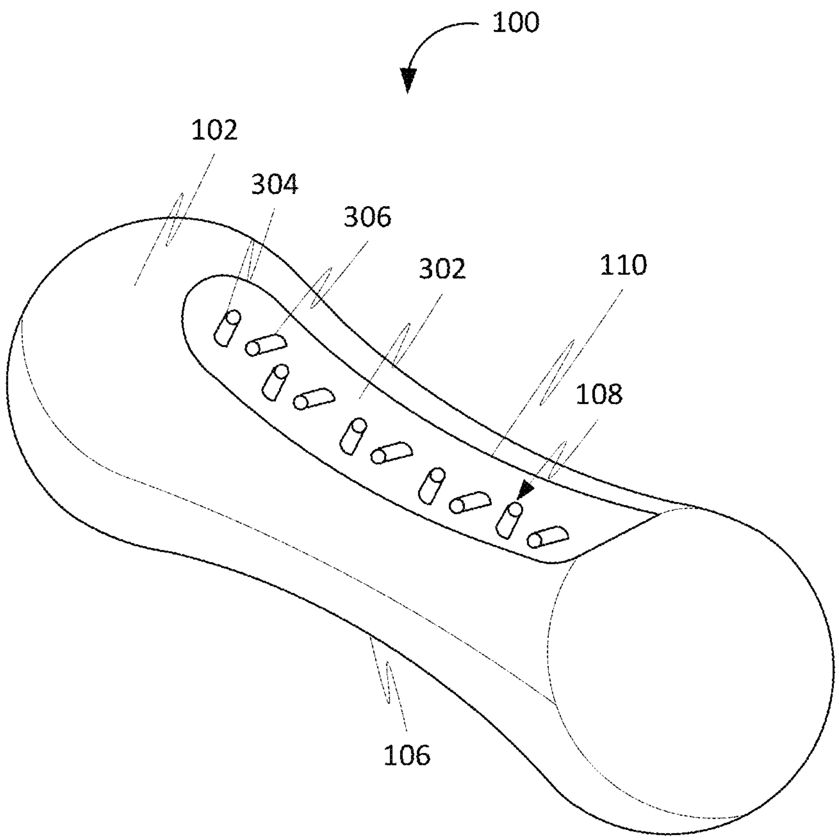
FIG. 3 is a top perspective view of the apparatus 100, in accordance with some embodiments.

Further, in some embodiments, the body 102 may include at least one interior surface 302, as shown in FIG. 3, defining the at least one interior space 108 and at least one protrusion 304-306, as shown in FIG. 3, extending from the at least one interior surface 302 in the at least one interior space 108. Further, the enhancing of the heat transfer from the at least one feed material may be based on the at least one protrusion 304-306.

Figure 4:
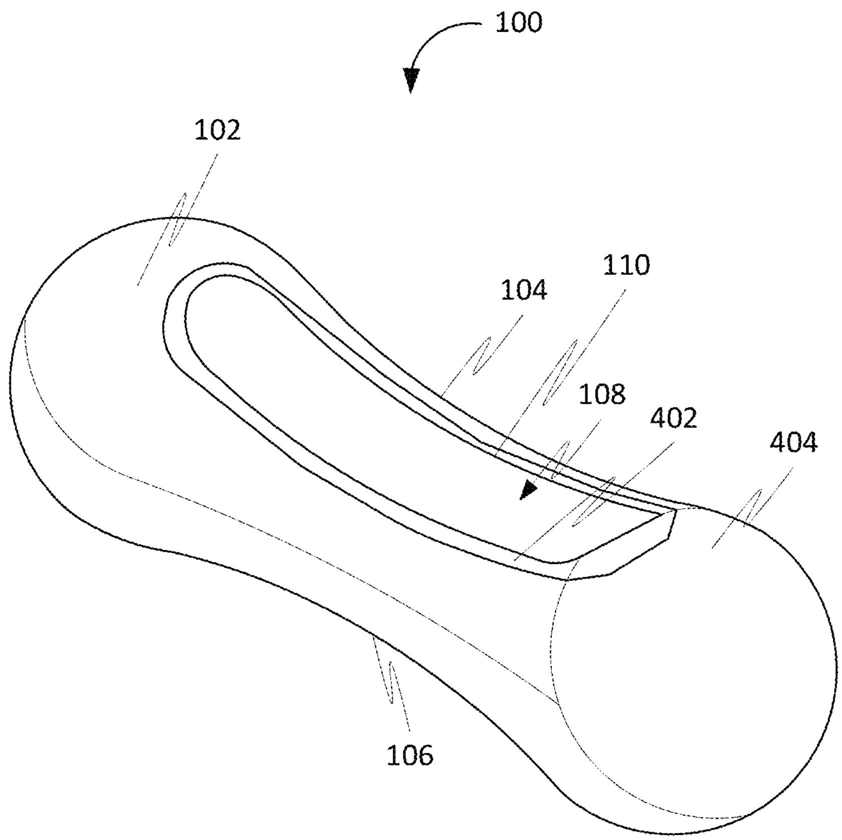
FIG. 4 is a top perspective view of the apparatus 100, in accordance with some embodiments.

Further, in some embodiments, the body 102 may be comprised of at least one material. Further, the body 102 may include at least one exterior surface 402 and a layer of heat conducting material 404, as shown in FIG. 4, attached to at least a portion of the at least one exterior surface 402. Further, a heat conductivity of the heat conducting material may be higher than the at least one material. Further, the enhancing of the heat transfer from the at least one feed material may be based on the layer of heat conducting material 404. Further, the at least one material may include silicone, natural rubber, etc. Further, the heat conducting material may include metals such as aluminum, copper, etc. Further, the heat conducting material allows faster freezing of the at least one feed material filled in the at least one interior space 108 when the apparatus 100 is kept in a freezer for the freezing of the at least one feed material.

Further, in an embodiment, the layer of heat conducting material 404 may be removably attached to at least the portion of the at least one exterior surface 402.

Figure 5:
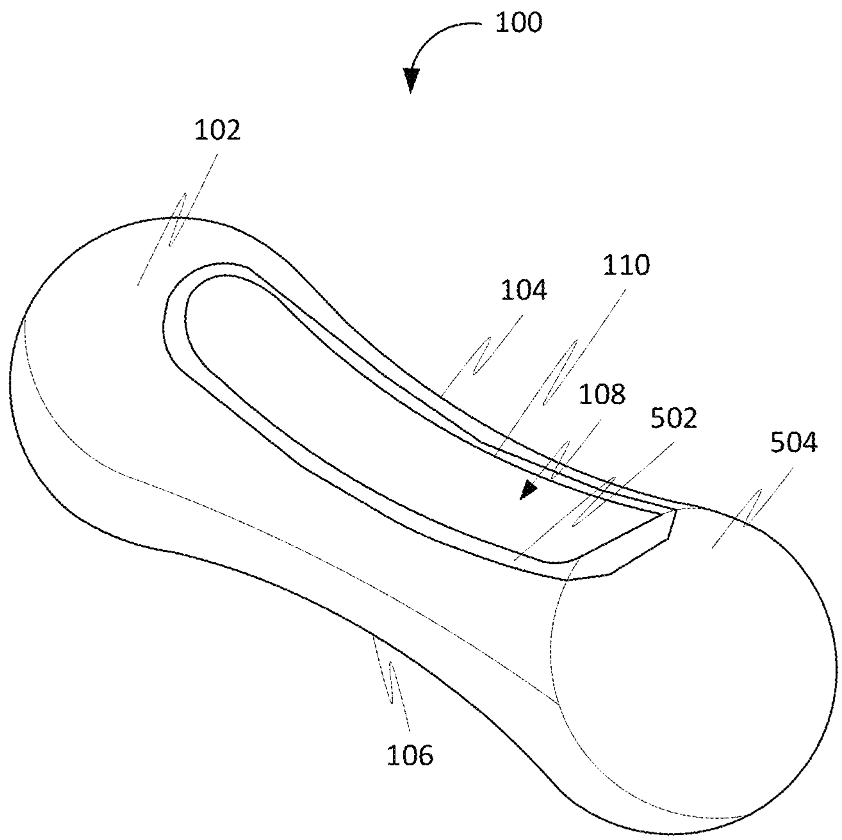
FIG. 5 is a top perspective view of the apparatus 100, in accordance with some embodiments.

Further, in some embodiments, the body 102 may be comprised of at least one material. Further, the body 102 may include at least one exterior surface 502 and a layer of heat insulating material 504, as shown in FIG. 5, attached to at least a portion of the at least one exterior surface 502. Further, a heat conductivity of the heat insulating material may be lower than the at least one material. Further, the restricting of the heat transfer to the at least one feed material may be further based on the layer of heat insulating material 504. Further, the at least one material may include natural rubber, silicone, etc. Further, the heat insulating material may include styrofoam, fiberglass, aerogels, silica aerogel, polyurethane Foam, etc. Further, the heat insulating material slows unfreezing of the at least one feed material filled in the at least one interior space 108 when the apparatus 100 is removed from a freezer for keeping the at least one feed material frozen for an extended duration.

Further, in an embodiment, the layer of heat insulating material 504 may be removably attached to at least the portion of the at least one exterior surface 502.

Further, in some embodiments, the body 102 may include a bottom surface comprised on the bottom side 106 of the body 102. Further, the bottom surface may be a flat surface. Further, the bottom surface contacts the surface for stably disposing the apparatus 100 on the surface. Further, the apparatus 100 may be able to stand in an upright position with the bottom surface contacting the surface based on the stably disposing of the apparatus 100 on the surface. Further, the surface may be a surface of the ground.

Further, in some embodiments, the body 102 may be comprised of at least one material. Further, the at least one material may be elastically flexible. Further, the at least one material may be silicone, natural rubber, etc. Further, the natural rubber allows faster freezing of the at least one feed material filled in the at least one interior space 108 when the apparatus 100 is kept in a freezer for the freezing of the at least one feed material.

Figure 6:
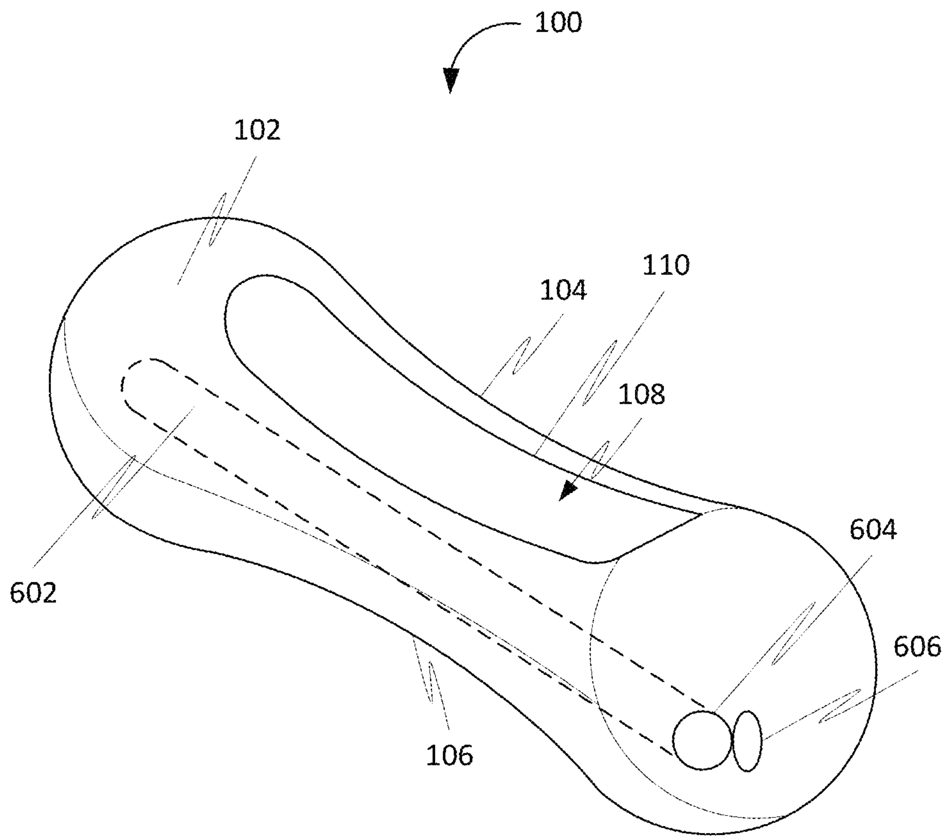
FIG. 6 is a top perspective view of the apparatus 100, in accordance with some embodiments.

Further, in some embodiments, the body 102 may be comprised of at least one material. Further, the body 102 may include at least one internal cavity 602, as shown in FIG. 6. Further, the at least one internal cavity 602 may be filled with at least one liquid. Further, a thermal conductivity of the at least one liquid may be greater than the at least one material. Further, the enhancing of the heat transfer from the at least one feed material may be based on the at least one liquid. Further, the at least one liquid may be a brine solution. Further, the at least one material may be silicone.

Further, in an embodiment, the body 102 may include at least one cavity opening 604, as shown in FIG. 6, leading into the at least one internal cavity 602 and at least one cavity lid 606, as shown in FIG. 6, coupled with the at least one cavity opening 604. Further, the at least one cavity lid 606 may be configured for transitioning the at least one cavity opening 604 between an open state and a closed state for openably closing the at least one cavity opening 604. Further, the at least one cavity opening 604 allows receiving of the at least one liquid in the at least one internal cavity 602 through the at least one cavity opening 604 in the open state. Further, the at least one cavity opening 604 restricts discharging of the at least one liquid from the at least one internal cavity 602 in the closed state.

Further, in an embodiment, the at least one cavity opening 604 allows discharging of the at least one liquid filled in the at least one internal cavity 602, through the at least one cavity opening 604 in the open state. Further, the at least one internal cavity 602 may be filled with air after the discharging of the at least one liquid filled in the at least one internal cavity 602, through the at least one cavity opening 604 in the open state. Further, the at least one cavity opening 604 restricts discharging of the air filled in the at least one internal cavity 602 in the closed state. Further, a thermal conductivity of the air may be less than the at least one material. Further, the restricting of the heat transfer to the at least one feed material may be based on the air.

Figure 7:
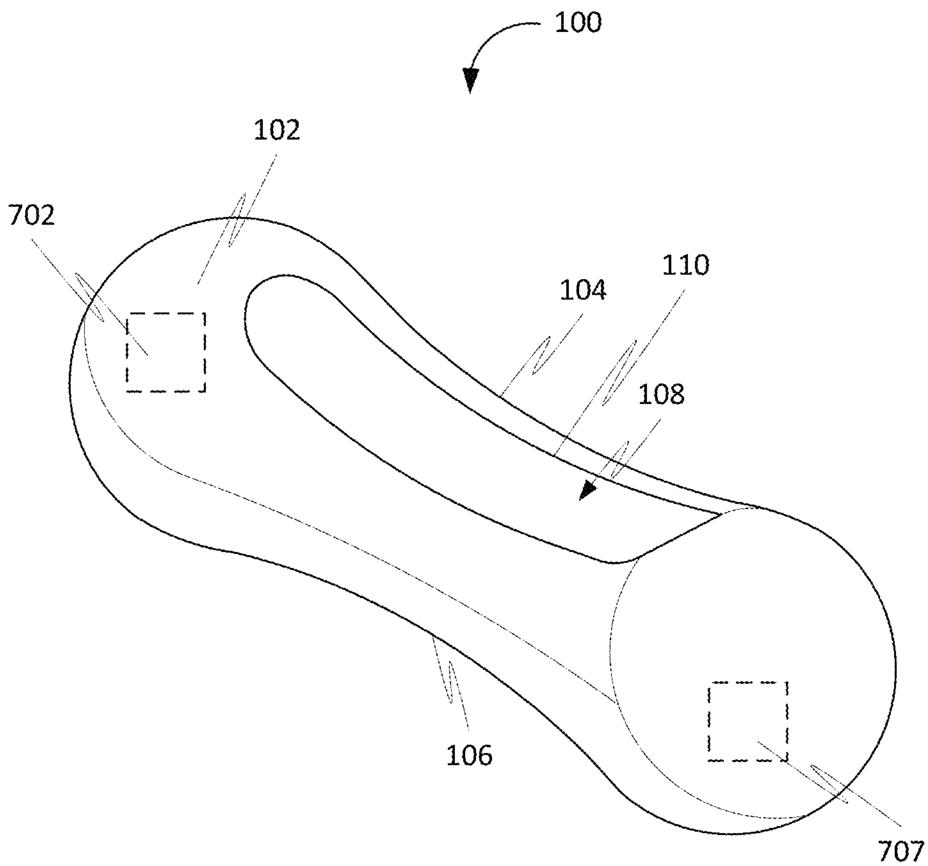
FIG. 7 is a top perspective view of the apparatus 100, in accordance with some embodiments.

Further, in some embodiments, the body 102 may include at least one weighted element 702-704, as shown in FIG. 7, of at least one weight. Further, the at least one weighted element 702-704 locates a center of mass of the body 102 after the filling of the at least one interior space 108 with the at least one feed material in a first location in the body 102. Further, the center of mass moves to a second location in the body 102 based on a tilting of the body 102 with respect to a vertical axis of the body 102. Further, a height of the first location of the center of mass may be lower than a height of the second location of the center of mass from a bottom end of the body 102. Further, the stably disposing of the body 102 on the surface may be based on the at least one weighted element 702-704.

Further, in some embodiments, the body 102 may include an elongated portion and a lobe portion. Further, the elongated portion may be an elongated body. Further, the elongated portion extends between a first end and a second end. Further, the lobe may be attached to the second end. Further, the at least one interior space 108 may be comprised in the elongated portion. Further, the at least one opening 110 may be comprised on the elongated portion at the first end.

Further, in some embodiments, the body 102 may include an elongated portion and two lobes. Further, the elongated portion extends between a first end and a second end. Further, a first lobe of the two lobes may be attached to the first end and a second lobe of the two lobes may be attached to the second end. Further, the at least one interior space 108 may include two interior spaces. Further, a first interior space of the two interior spaces may be comprised in the first lobe and a second interior space of the two interior spaces may be comprised in the second lobe. Further, the at least one opening 110 may include two openings. Further, a first opening of the two openings may be comprised in the first lobe and a second opening of the two openings may be comprised in the second lobe.

Further, in some embodiments, the allowing of the consumption of the at least one feed material may include allowing a consumption of the at least one feed material portionably based on the licking of a portion of one or more portions of the at least one feed material. Further, the at least one opening 110 exposes the portion of the one or more portions of the at least one feed material to the licking of the at least one animal through the at least one opening 110. Further, the licking of the portion of the one or more portions of the at least one feed material through the at least one opening 110 raises a temperature of the portion of the one or more portions of the at least one feed material from a frozen temperature to a consumable temperature for the allowing of the consumption of the at least one feed material portionably based on the licking of the portion of the one or more portions of the at least one feed material.

FIG. 2 is a top perspective view of the apparatus 100, in accordance with some embodiments.

FIG. 3 is a top perspective view of the apparatus 100, in accordance with some embodiments.

FIG. 4 is a top perspective view of the apparatus 100, in accordance with some embodiments.

FIG. 5 is a top perspective view of the apparatus 100, in accordance with some embodiments.

FIG. 6 is a top perspective view of the apparatus 100, in accordance with some embodiments.

FIG. 7 is a top perspective view of the apparatus 100, in accordance with some embodiments.

Figure 8:
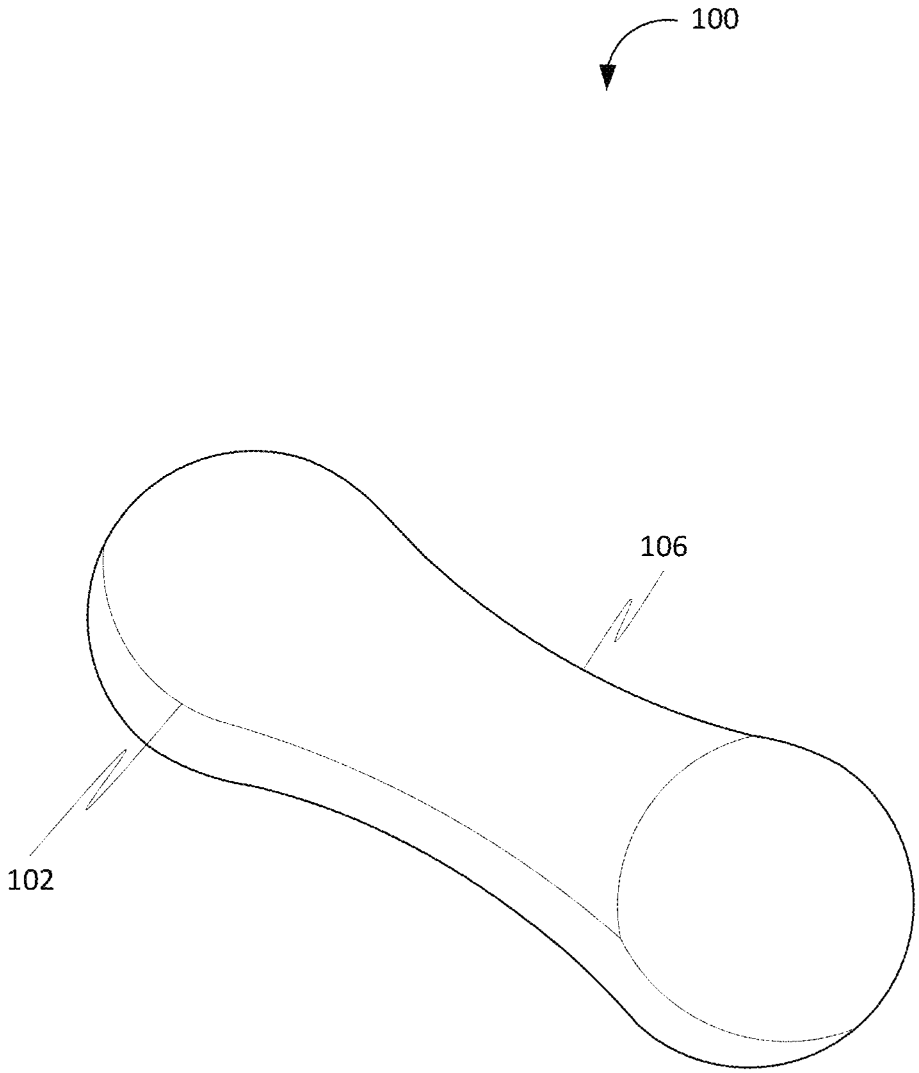
FIG. 8 is a bottom perspective view of the apparatus 100, in accordance with some embodiments.

FIG. 8 is a bottom perspective view of the apparatus 100, in accordance with some embodiments.

Figure 9:
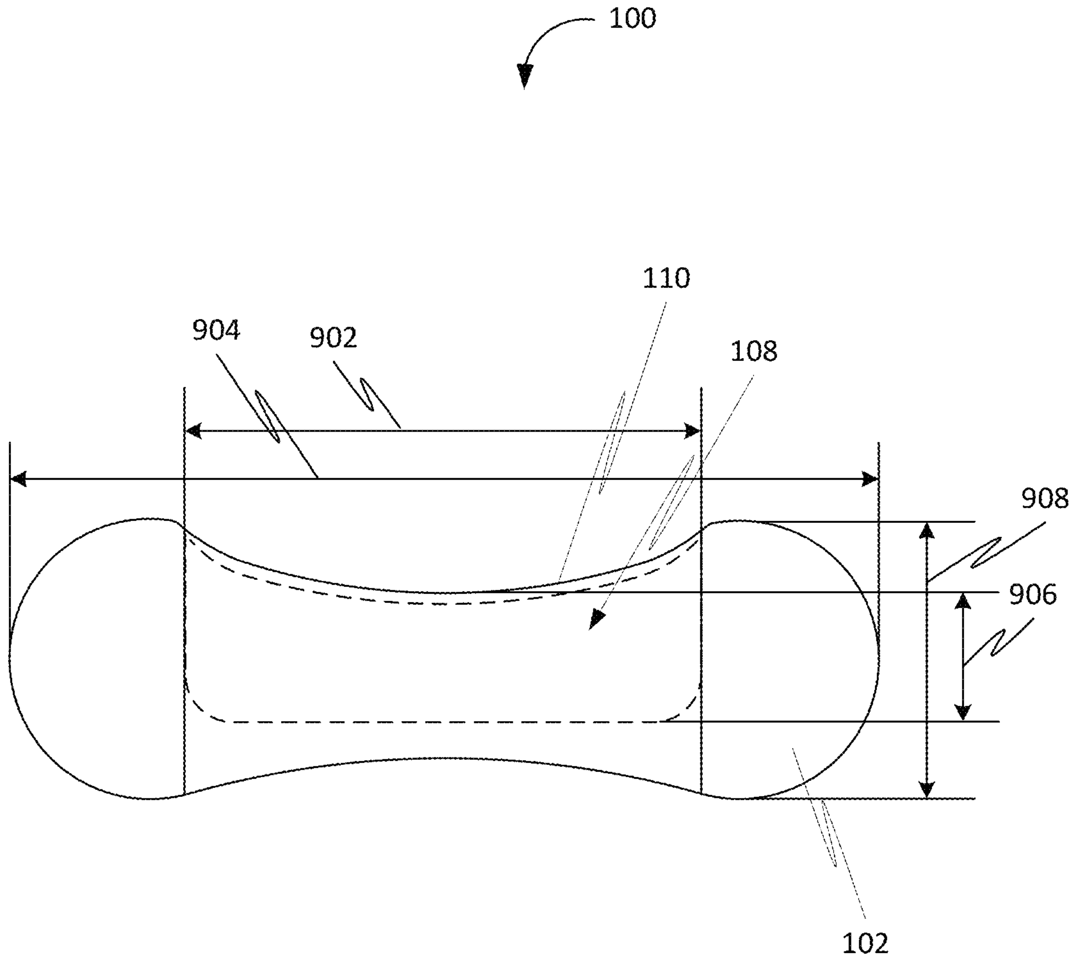
FIG. 9 is a front view of the apparatus 100, in accordance with some embodiments.

FIG. 9 is a front view of the apparatus 100, in accordance with some embodiments. Further, the apparatus 100 may be associated with a first dimension 902, a second dimension 904, a third dimension 906, and a fourth dimension 908. Further, the first dimension 902 may be 120 mm, 100 mm, etc. Further, the second dimension 904 may be 200 mm, 180 mm, etc. Further, the third dimension 906 may be 30.64 mm, 25 mm, etc. Further, the fourth dimension 908 may be 63.83 mm, 63.69 mm, etc.

Figure 10:
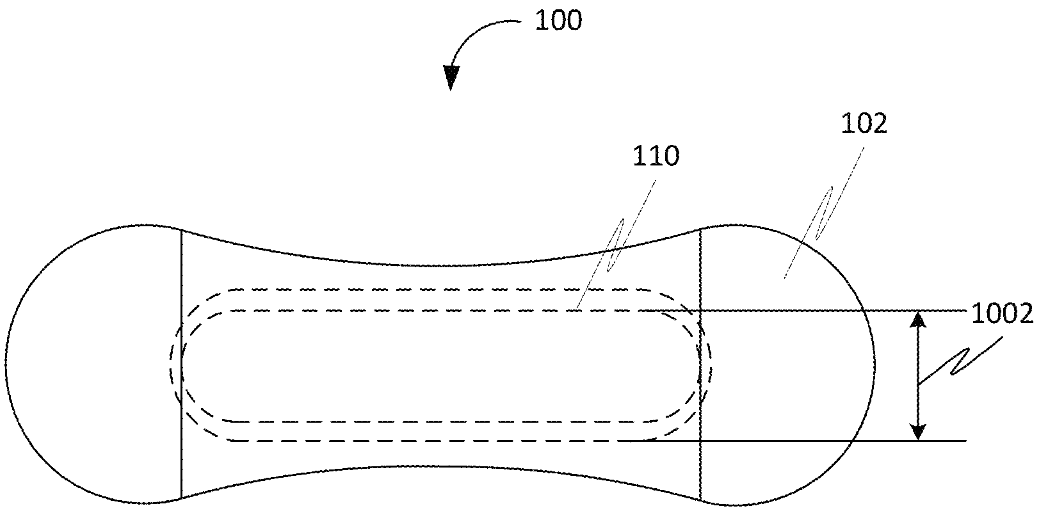
FIG. 10 is a top view of the apparatus 100, in accordance with some embodiments.

FIG. 10 is a top view of the apparatus 100, in accordance with some embodiments. Further, the at least one opening 110 may be associated with a dimension 1002. Further, the dimension 1002 may be 25 mm, 20 mm, etc. Further, the dimension 1002 may be a diameter.

Figure 11:
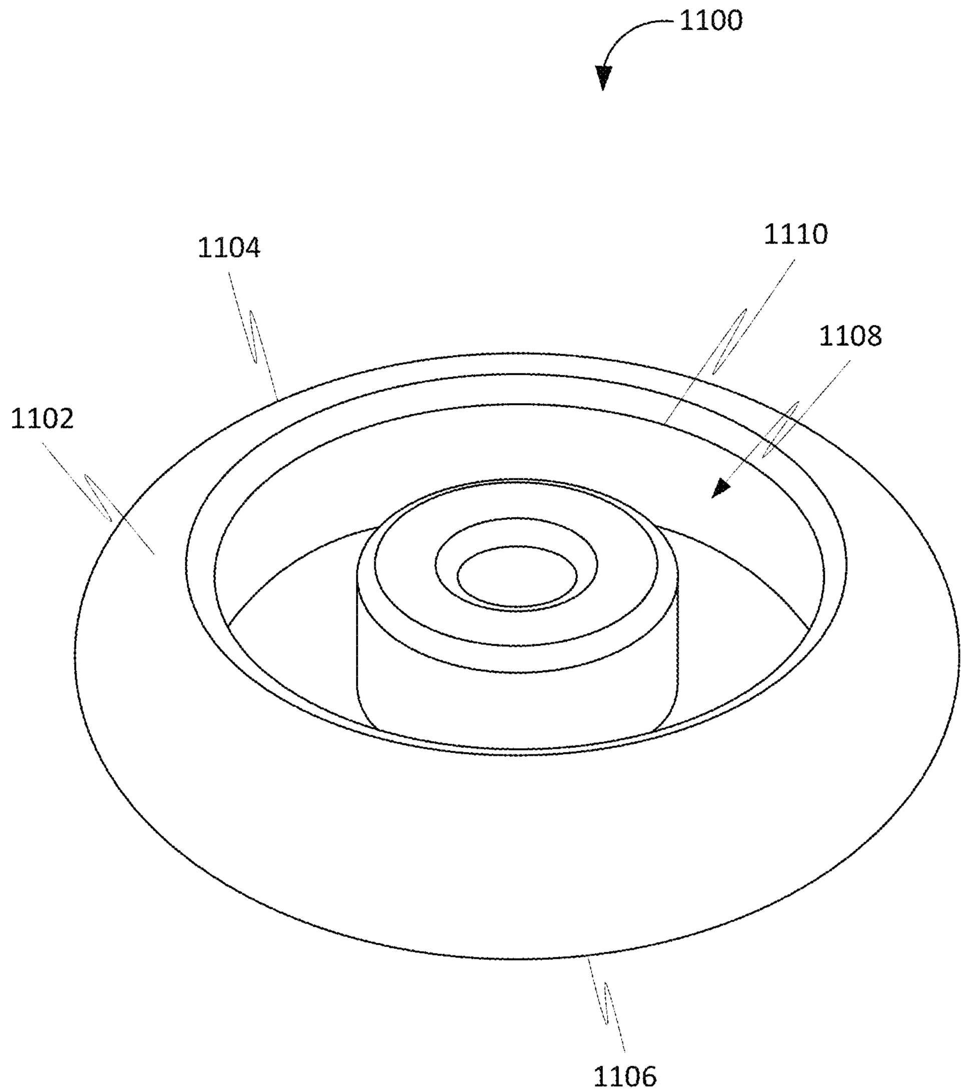
FIG. 11 is a top perspective view of an apparatus 1100 for facilitating feeding of animals, in accordance with some embodiments.

FIG. 11 is a top perspective view of an apparatus 1100 for facilitating feeding of animals, in accordance with some embodiments. Further, the apparatus 1100 may include a body 1102 having a top side 1104 and a bottom side 1106 opposing the top side 1104. Further, the body 1102 may include at least one interior space 1108 and at least one opening 1110 leading into the at least one interior space 1108.

Figure 12:
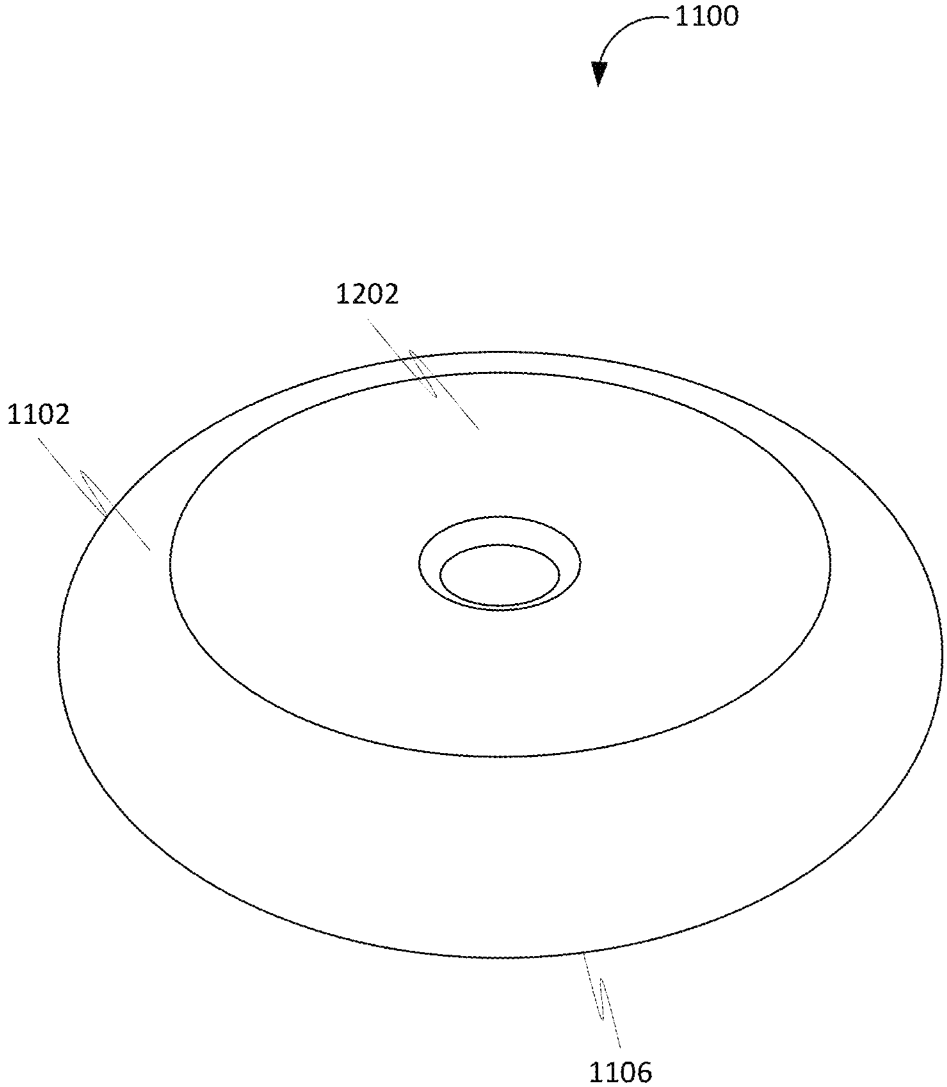
FIG. 12 is a bottom perspective view of the apparatus 1100, in accordance with some embodiments.

FIG. 12 is a bottom perspective view of the apparatus 1100, in accordance with some embodiments. Further, the body 1102 may be configured to be stably disposed on a surface for serving at least one feed material to at least one animal after the freezing of the at least one feed material transferred in the at least one interior space 1108 through the at least one opening 1110. Further, in some embodiments, the body 1102 may include a bottom surface 1202 comprised on the bottom side 1106 of the body 1102. Further, the bottom surface 1202 may be a flat surface. Further, the bottom surface 1202 contacts the surface for stably disposing the apparatus 1100 on the surface.

Figure 13:
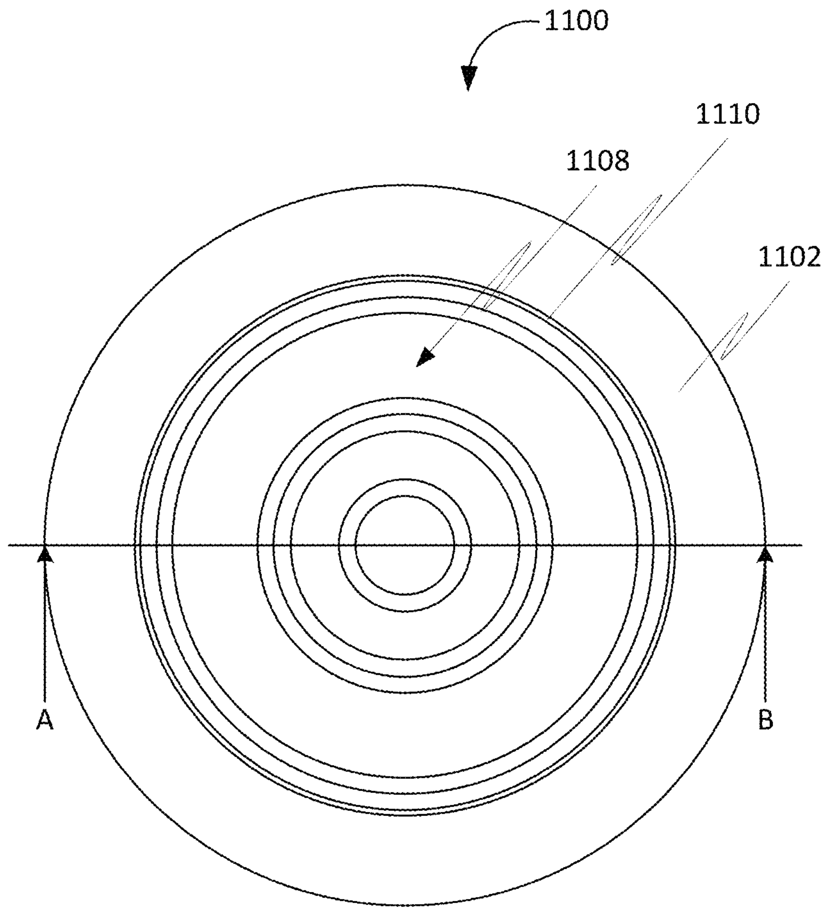
FIG. 13 is a top view of the apparatus 1100, in accordance with some embodiments.

FIG. 13 is a top view of the apparatus 1100, in accordance with some embodiments.

Figure 14:
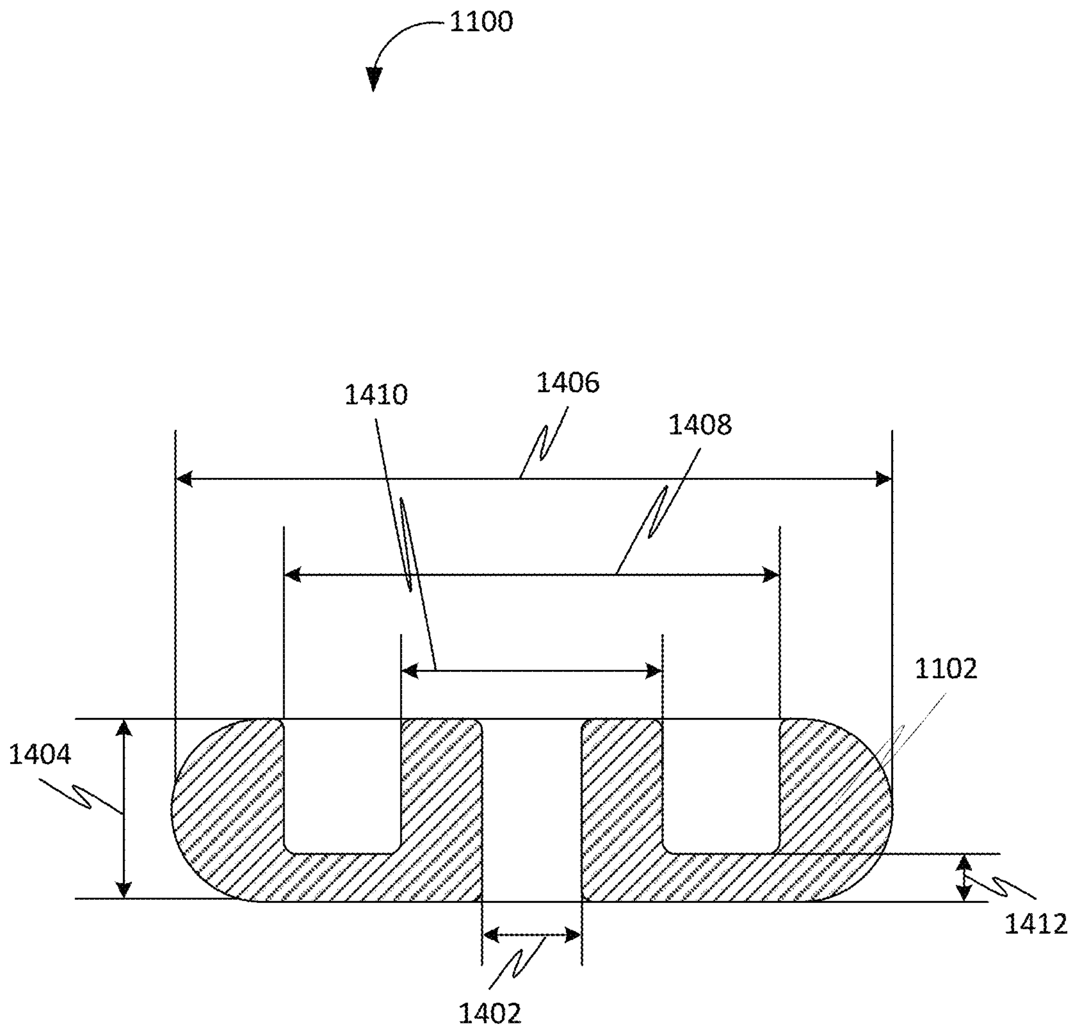
FIG. 14 is a cross sectional side view of the apparatus 1100 along line A-B of FIG. 13, in accordance with some embodiments.

FIG. 14 is a cross sectional side view of the apparatus 1100 along line A-B of FIG. 13, in accordance with some embodiments. Further, the apparatus 1100 may be associated with a first dimension 1402, a second dimension 1404, a third dimension 1406, a fourth dimension 1408, a fifth dimension 1410, and a sixth dimension 1412. Further, the first dimension 1402 may be 15 mm. Further, the second dimension 1404 may be 27.72 mm. Further, the third dimension 1406 may be 110 mm. Further, the fourth dimension 1408 may be 76 mm. Further, the fifth dimension 1410 may be 40 mm. Further, the sixth dimension 1412 may be 7.00 mm. Further, the first dimension 1402, the third dimension 1406, the fourth dimension 1408, and the fifth dimension 1410 may be a diameter.

Figure 15:
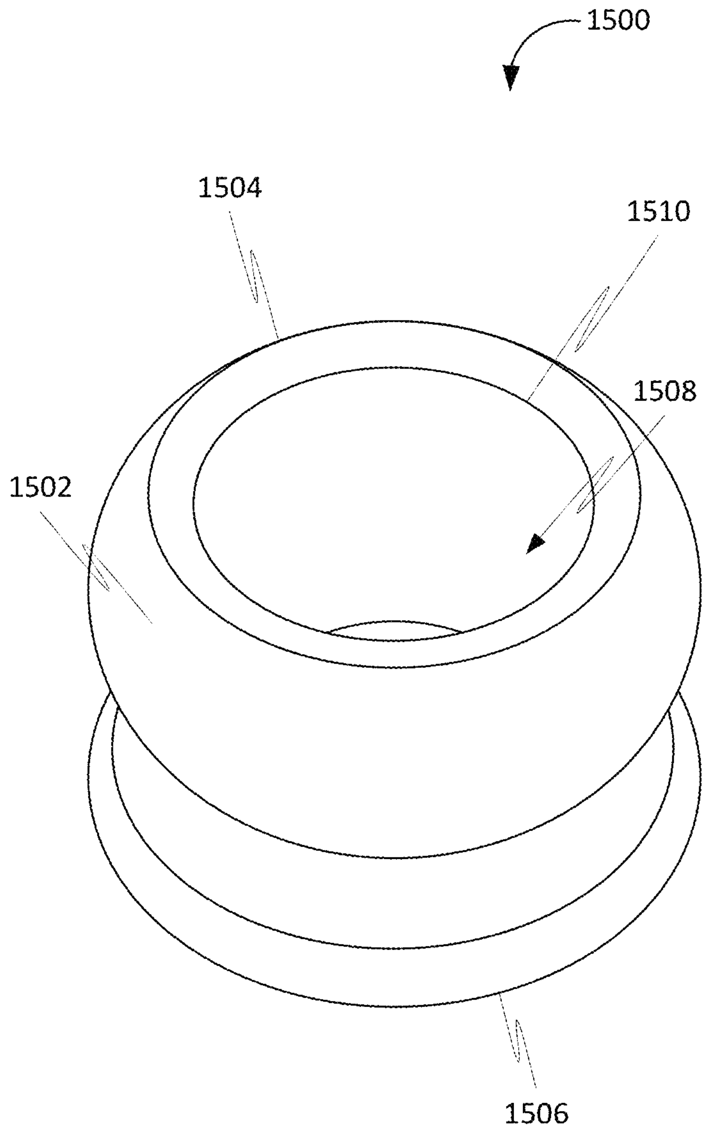
FIG. 15 is a top perspective view of an apparatus 1500 for facilitating feeding of animals, in accordance with some embodiments.

FIG. 15 is a top perspective view of an apparatus 1500 for facilitating feeding of animals, in accordance with some embodiments. Further, the apparatus 1500 may include a body 1502 having a top side 1504 and a bottom side 1506 opposing the top side 1504. Further, the body 1502 may include at least one interior space 1508 and at least one opening 1510 leading into the at least one interior space 1508.

Figure 16:
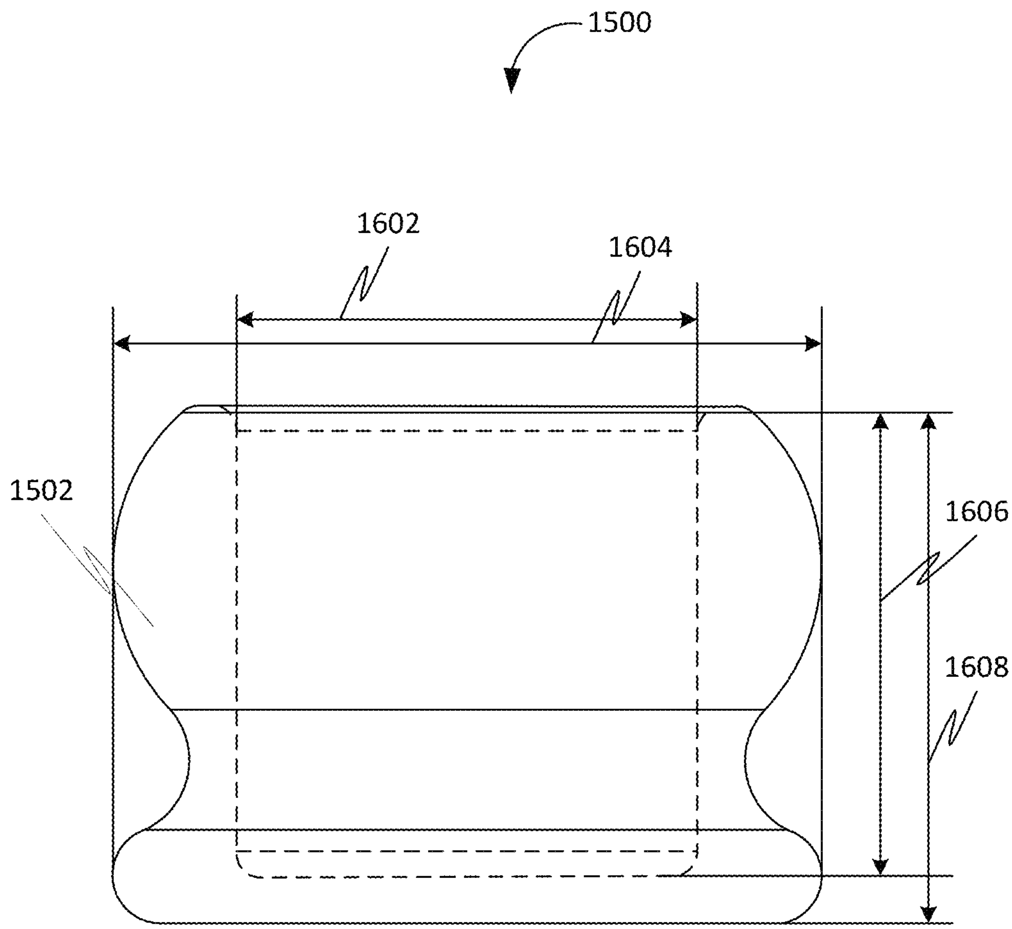
FIG. 16 is a side view of the apparatus 1500, in accordance with some embodiments.

FIG. 16 is a side view of the apparatus 1500, in accordance with some embodiments. Further, the apparatus 1500 may be associated with a first dimension 1602, a second dimension 1604, a third dimension 1606, and a fourth dimension 1608. Further, the first dimension 1602 may be 74 mm, 62 mm, etc. Further, the second dimension 1604 may be 48 mm, 36 mm, etc. Further, the third dimension 1606 may be 54 mm, 53 mm, etc. Further, the fourth dimension 1608 may be 49 mm, 48 mm, etc. Further, the first dimension 1602 and the second dimension 1604 may be a diameter.

Figure 17:
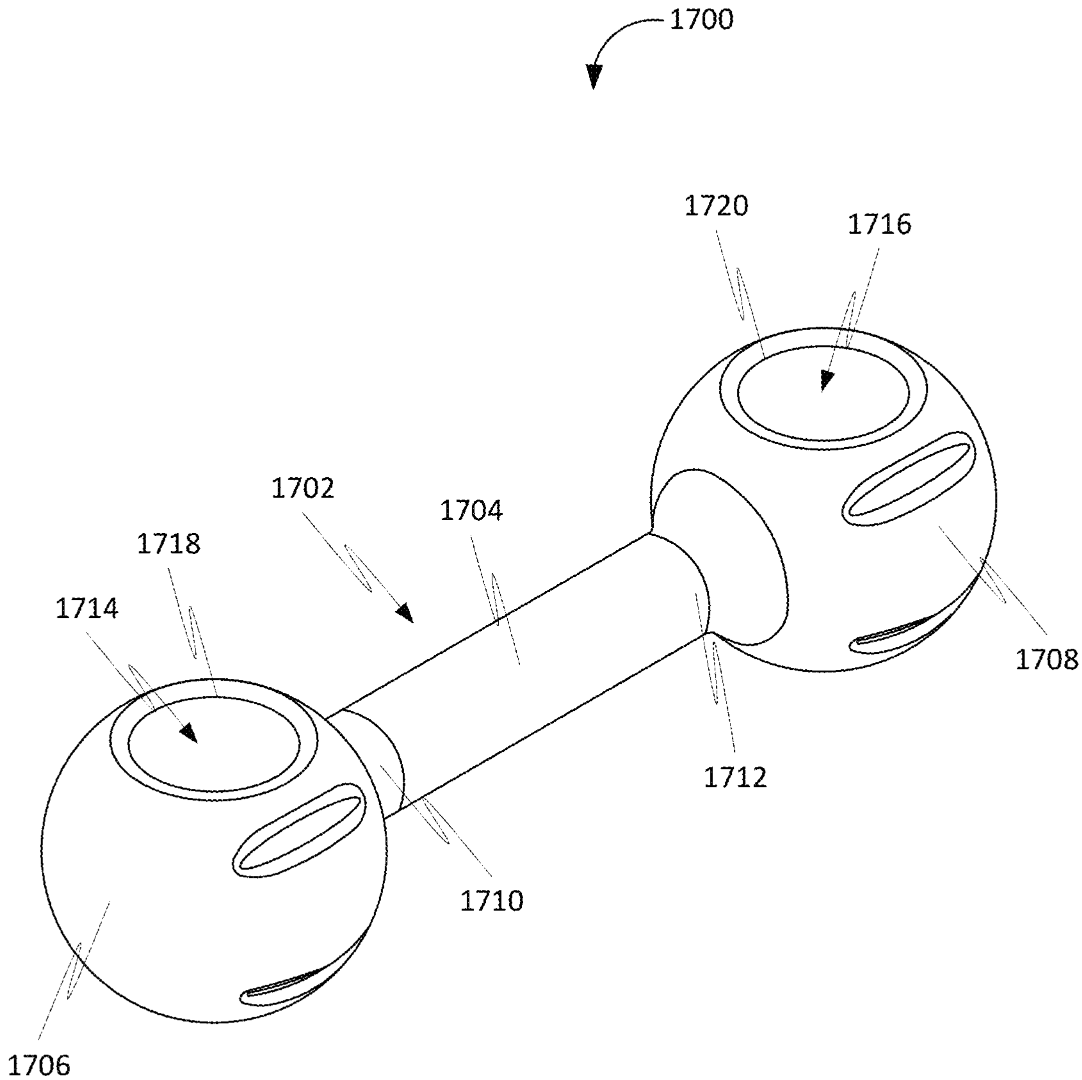
FIG. 17 is a top perspective view of an apparatus 1700 for facilitating feeding of animals, in accordance with some embodiments.

FIG. 17 is a top perspective view of an apparatus 1700 for facilitating feeding of animals, in accordance with some embodiments. Further, the apparatus 1700 may include a body 1702 comprising an elongated portion 1704 and two lobes 1706-1708. Further, the elongated portion 1704 extends between a first end 1710 and a second end 1712. Further, a first lobe 1706 of the two lobes 1706-1708 may be attached to the first end 1710 and a second lobe 1708 of the two lobes 1706-1708 may be attached to the second end 1712. Further, the body 1702 may include two interior spaces 1714-1716. Further, a first interior space 1714 of the two interior spaces 1714-1716 may be comprised in the first lobe 1706 and a second interior space 1716 of the two interior spaces 1714-1716 may be comprised in the second lobe 1708. Further, the body 1702 may include two openings 1718-1720. Further, a first opening 1718 of the two openings 1718-1720 may be comprised in the first lobe 1706 and a second opening 1720 of the two openings 1718-1720 may be comprised in the second lobe 1708.

Figure 18:
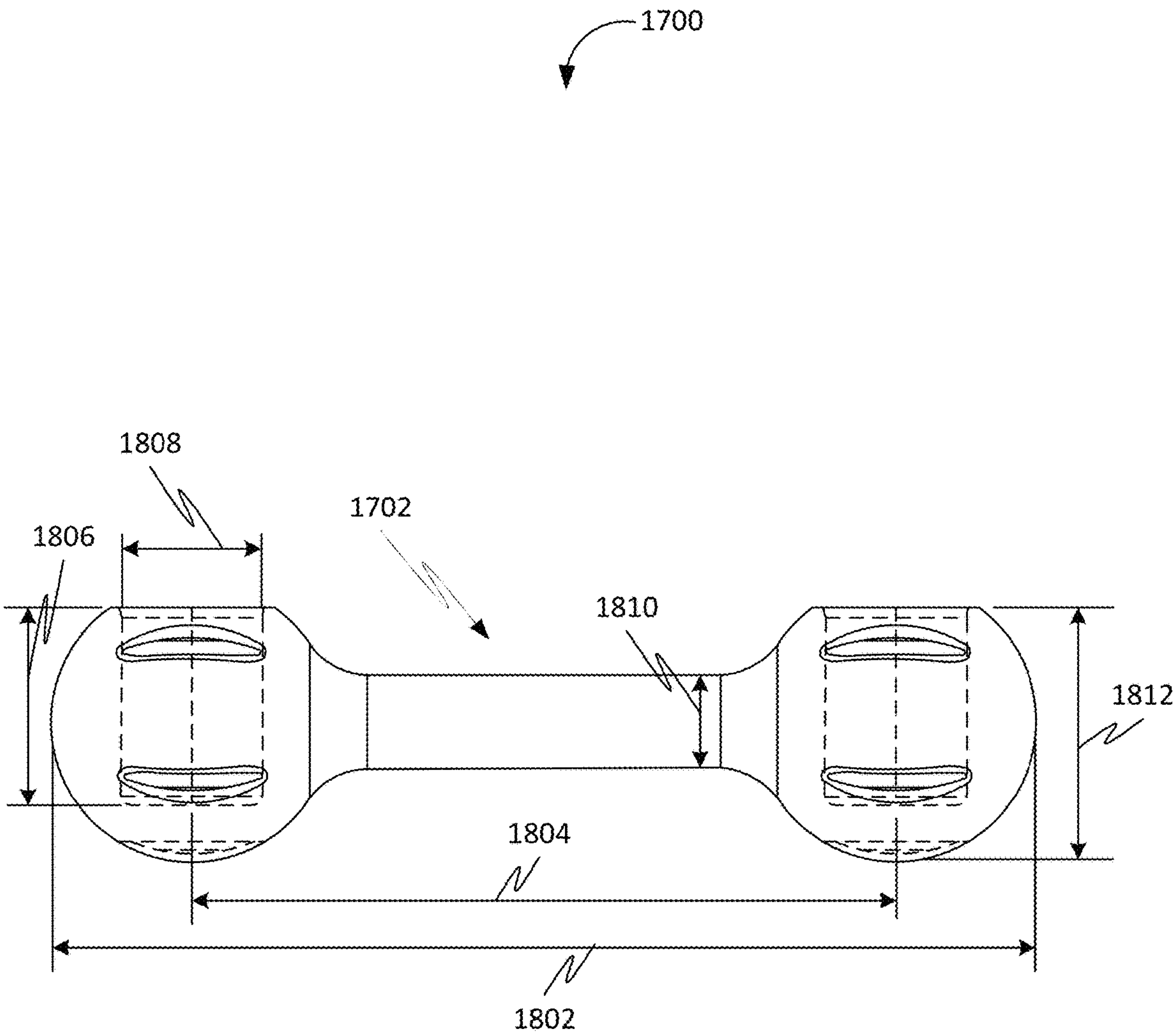
FIG. 18 is a front view of the apparatus 1700, in accordance with some embodiments.

FIG. 18 is a front view of the apparatus 1700, in accordance with some embodiments. Further, the apparatus 1700 may be associated with a first dimension 1802, a second dimension 1804, a third dimension 1806, a fourth dimension 1808, a fifth dimension 1810, and a sixth dimension 1812. Further, the first dimension 1802 may be 210 mm. Further, the second dimension 1804 may be 150 mm. Further, the third dimension 1806 may be 42 mm. Further, the fourth dimension 1808 may be 30 mm. Further, the fifth dimension 1810 may be 20 mm. Further, the sixth dimension 1812 may be 53.96 mm. Further, the fourth dimension 1808 and the fifth dimension 1810 may be a diameter.

Figure 19:
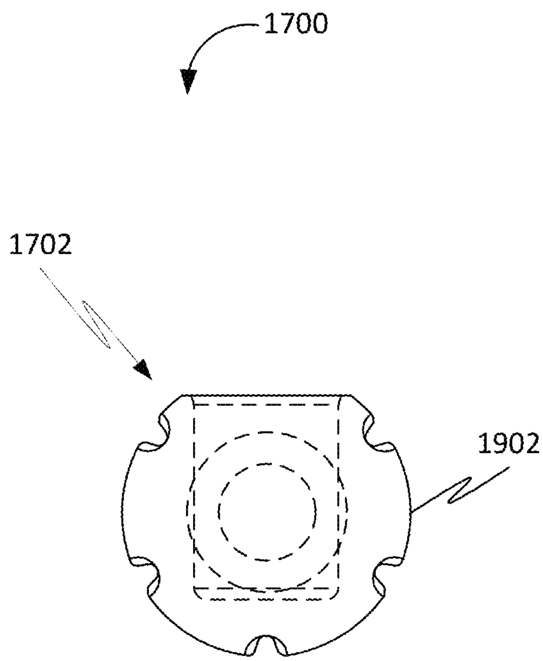
FIG. 19 is a side view of the apparatus 1700, in accordance with some embodiments.

FIG. 19 is a side view of the apparatus 1700, in accordance with some embodiments. Further, the apparatus 1700 may be associated with a dimension 1902. Further, the dimension 1902 may be 60 mm. Further, the dimension 1902 may be a diameter.

Figure 20:
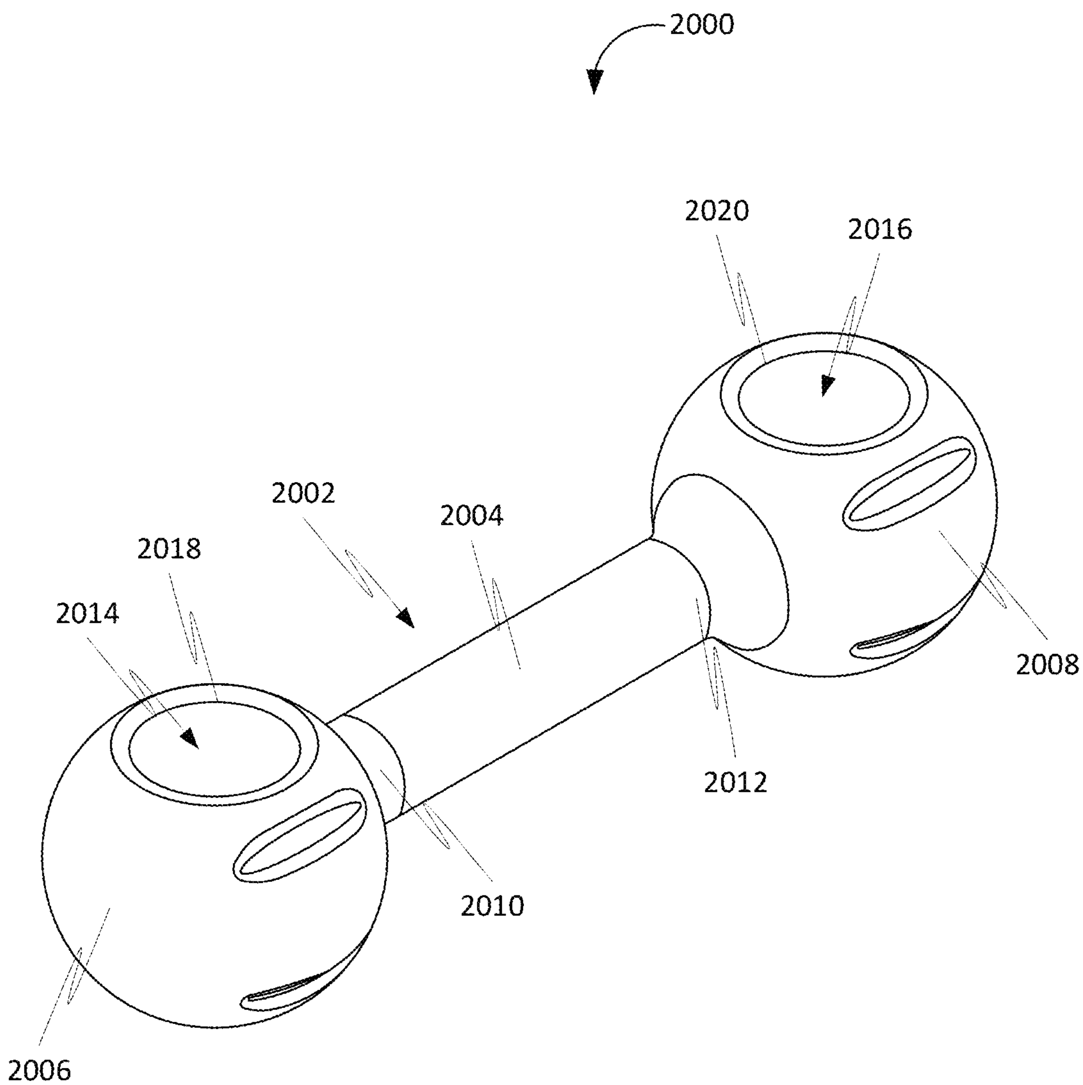
FIG. 20 is a top perspective view of an apparatus 2000 for facilitating feeding of animals, in accordance with some embodiments.

FIG. 20 is a top perspective view of an apparatus 2000 for facilitating feeding of animals, in accordance with some embodiments. Further, the apparatus 2000 may include a body 2002 having a top side and a bottom side opposing the top side. Further, the body 2002 may include at least one interior space 2014-2016 and at least one opening 2018-2020 leading into the at least one interior space 2014-2016. Further, the at least one opening 2018-2020 may be disposed on the top side of the body 2002. Further, the at least one interior space 2014-2016 may be configured to be fillable with at least one feed material by transferring the at least one fillable material into the at least one interior space 2014-2016 through the at least one opening 2018-2020. Further, the body 2002 may be configured for enhancing heat transfer from the at least one feed material filled in the at least one interior space 2014-2016 to an exterior of the apparatus 2000 for freezing the at least one feed material. Further, the body 2002 may be configured to be stably disposed on a surface for serving the at least one feed material to at least one animal after the freezing of the at least one feed material. Further, the body 2002 may be configured for restricting heat transfer to the at least one feed material filled in the at least one interior space 2014-2016 from the exterior of the apparatus 2000. Further, the body 2002 may be configured for allowing a consumption of the at least one feed material based on licking of the at least one feed material by the at least one animal through the at least one opening 2018-2020 for facilitating the feeding of the at least one animal. Further, the body 2002 may include an elongated portion 2004 and two lobes 2006-2008. Further, the elongated portion 2004 extends between a first end 2010 and a second end 2012. Further, a first lobe 2006 of the two lobes 2006-2008 may be attached to the first end 2010 and a second lobe 2008 of the two lobes 2006-2008 may be attached to the second end 2012. Further, the at least one interior space 2014-2016 may include two interior spaces 2014-2016. Further, a first interior space 2014 of the two interior spaces 2014-2016 may be comprised in the first lobe 2006 and a second interior space 2016 of the two interior spaces 2014-2016 may be comprised in the second lobe 2008. Further, the at least one opening 2018-2020 may include two openings 2018-2020. Further, a first opening 2018 of the two openings 2018-2020 may be comprised in the first lobe 2006 and a second opening 2020 of the two openings 2018-2020 may be comprised in the second lobe 2008.

Further, in some embodiments, the body 2002 may include at least one weighted element of at least one weight. Further, the at least one weighted element locates a center of mass of the body 2002 after the filling of the at least one interior space 2014-2016 with the at least one feed material in a first location in the body 2002. Further, the center of mass moves to a second location in the body 2002 based on a tilting of the body 2002 with respect to a vertical axis of the body 2002. Further, a height of the first location of the center of mass may be lower than a height of the second location of the center of mass from a bottom end of the body 2002. Further, the stably disposing of the body 2002 on the surface may be based on the at least one weighted element.

Figure 21:
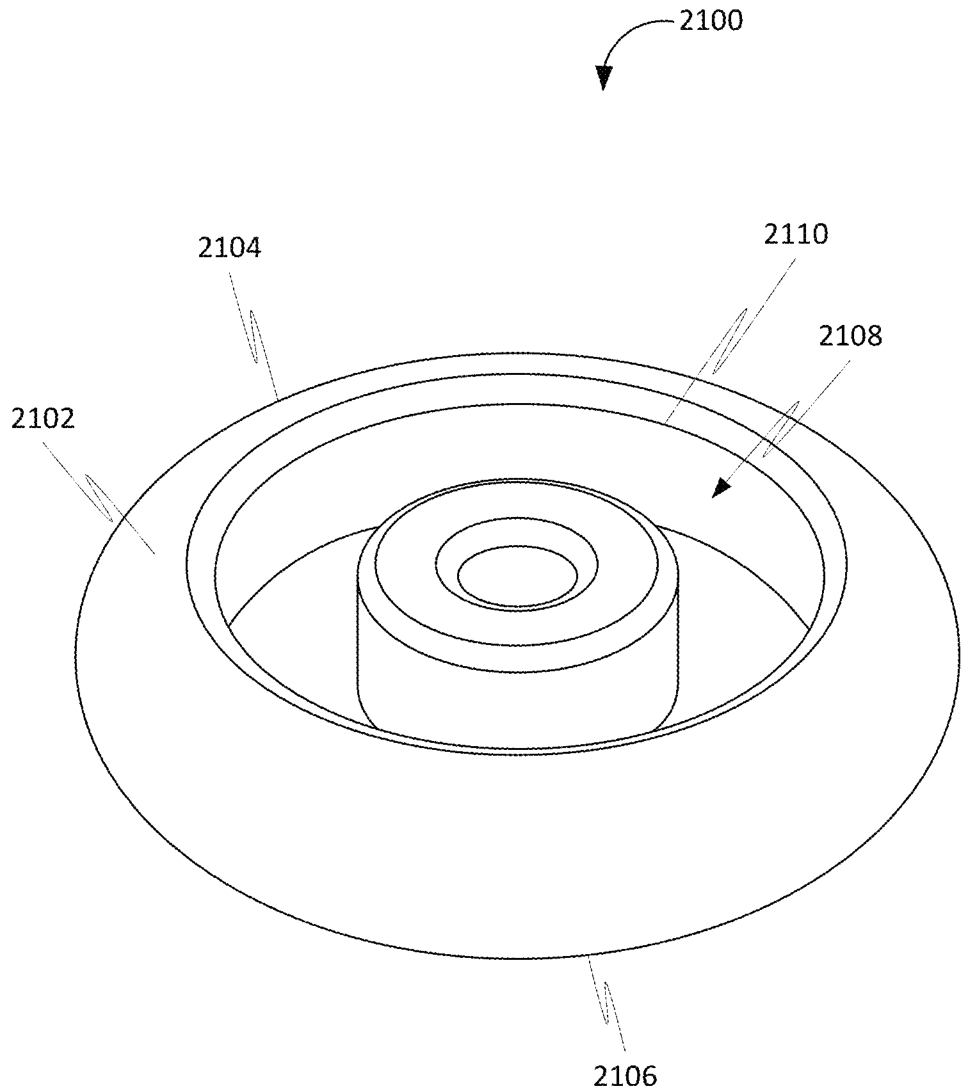
FIG. 21 is a top perspective view of an apparatus 2100 for facilitating feeding of animals, in accordance with some embodiments.
Figure 22:
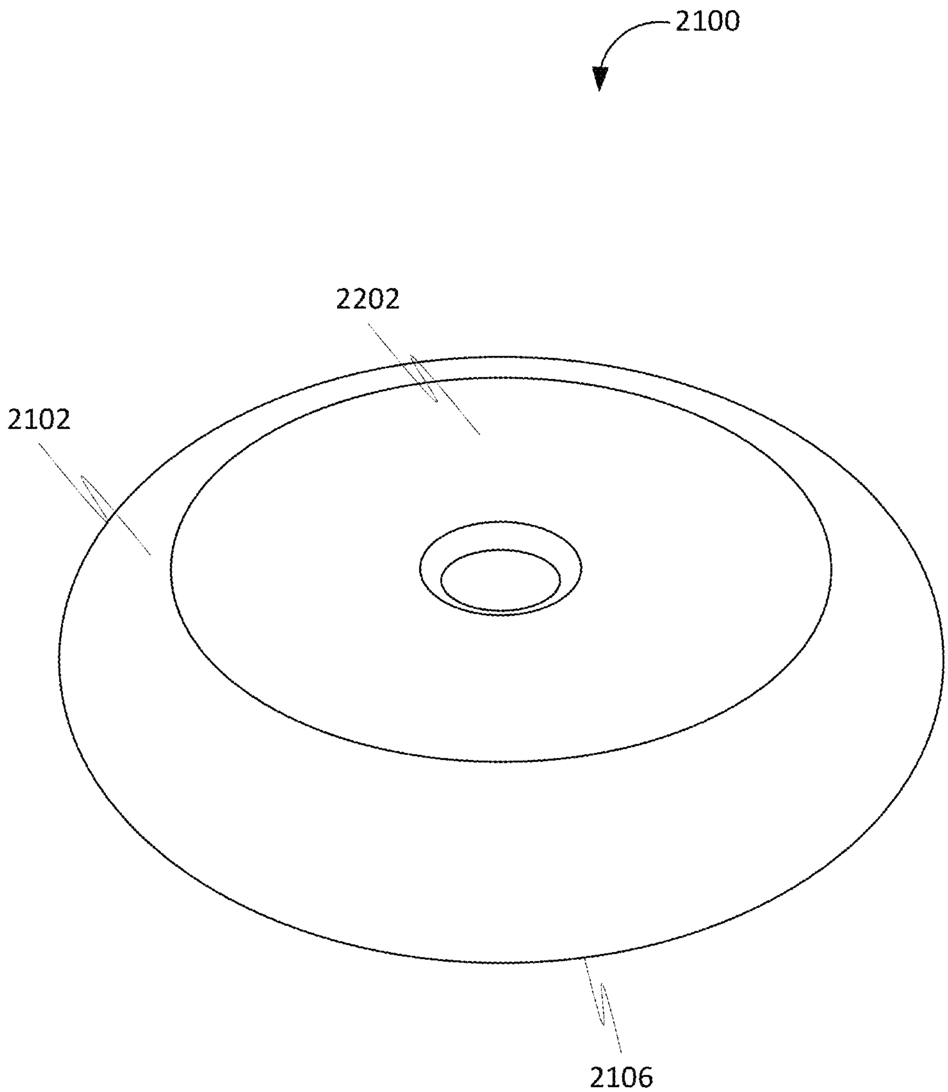
FIG. 22 is a bottom perspective view of the apparatus 2100, in accordance with some embodiments.

FIG. 21 is a top perspective view of an apparatus 2100 for facilitating feeding of animals, in accordance with some embodiments. Further, the apparatus 2100 may include a body 2102 having a top side 2104 and a bottom side 2106 opposing the top side 2104. Further, the body 2102 may include at least one interior space 2108 and at least one opening 2110 leading into the at least one interior space 2108. Further, the at least one opening 2110 may be disposed on the top side 2104 of the body 2102. Further, the at least one interior space 2108 may be configured to be fillable with at least one feed material by transferring the at least one fillable material into the at least one interior space 2108 through the at least one opening 2110. Further, the body 2102 may be configured for enhancing heat transfer from the at least one feed material filled in the at least one interior space 2108 to an exterior of the apparatus 2100 for freezing the at least one feed material. Further, the body 2102 may be configured to be stably disposed on a surface for serving the at least one feed material to at least one animal after the freezing of the at least one feed material. Further, the body 2102 may include a bottom surface 2202, as shown in FIG. 22, comprised on the bottom side 2106 of the body 2102. Further, the bottom surface 2202 may be a flat surface. Further, the bottom surface 2202 contacts the surface for stably disposing the apparatus 2100 on the surface. Further, the body 2102 may be configured for restricting heat transfer to the at least one feed material filled in the at least one interior space 2108 from the exterior of the apparatus 2100. Further, the body 2102 may be configured for allowing a consumption of the at least one feed material based on licking of the at least one feed material by the at least one animal through the at least one opening 2110 for facilitating the feeding of the at least one animal.

FIG. 22 is a bottom perspective view of the apparatus 2100, in accordance with some embodiments.

Figure 23:
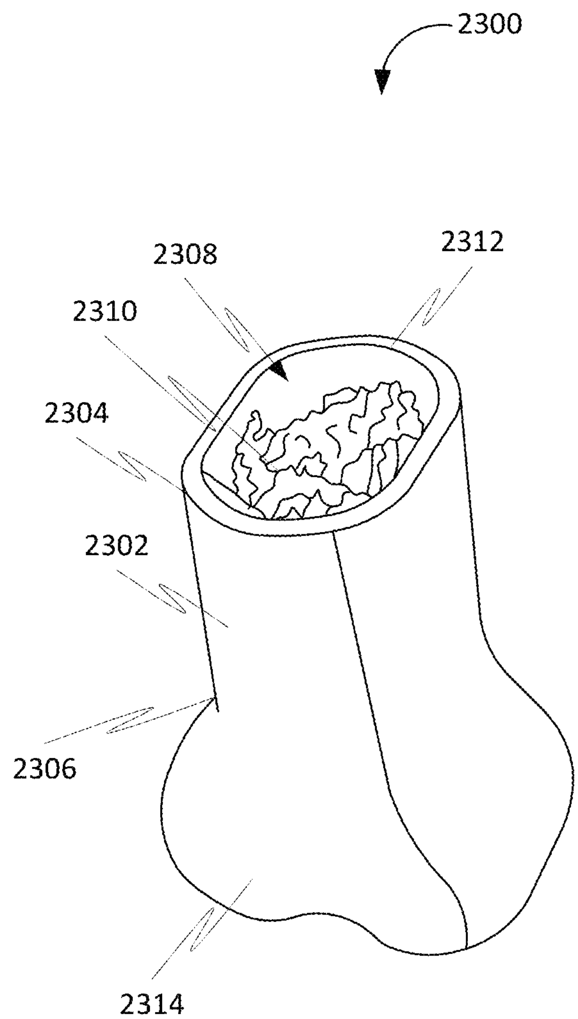
FIG. 23 is a top perspective view of an apparatus 2300 for facilitating feeding of pets, in accordance with some embodiments.

FIG. 23 is a top perspective view of an apparatus 2300 for facilitating feeding of pets, in accordance with some embodiments. Accordingly, the apparatus 2300 may be served cold to at least one pet. Further, the apparatus 2300 may be a refillable bone. Further, the apparatus 2300 may include an elongated body 2302 extending between a first end 2304 and a second end 2306. Further, the elongated body 2302 may include an interior cavity 2308 extending from the first end 2304 to the second end 2306. Further, the interior cavity 2308 may be filled with at least one feed material 2310 by at least one user. Further, the elongated body 2302 may include an opening 2312 disposed at the first end 2304 and leading into the interior cavity 2308. Further, the opening 2312 may be circularly shaped. Further, the elongated body 2302 may be comprised of a unique formulation and a natural rubber for allowing the apparatus 2300 to be frozen in a freezer. Further, the elongated body 2302 may be robust and hard to be chewed on by the at least one pet. Further, the elongated body 2302 may include at least one lobe 2314 disposed on the second end 2306. Further, the elongated body 2302 resembles a half broken bone. Further, in an embodiment, a cross-sectional area of the opening 2312 may be substantially equal to a cross-sectional area of the elongated body 2302. Further, in an embodiment, the elongated body 2302 may include a first half portion and a second half portion. Further, the first half portion may be attached to the second half portion for forming the elongated body 2302.

Further, in some embodiments, the elongated body 2302 may be configured to be filled with the at least one feed material 2310 from at least one container. Further, the at least one container stores the at least one feed material 2310. Further, the at least one container may include a pouch. Further, the elongated body 2302 receives the at least one feed material 2310 in the interior cavity 2308 through the opening 2312.

Further, in some embodiments, the elongated body 2302 may be configured for dispensing at least one amount of the at least one feed material 2310 from the interior cavity 2308 through the opening 2312 based on at least one action performed by the at least one pet on the elongated body 2302. Further, the at least one action may include the licking, chewing, stroking, pressing, etc. Further, the at least one pet may include a dog, a cat, etc. Further, the at least one pet feeds on the at least one amount of the at least one feed material 2310 dispensed from the elongated body 2302. Further, the at least one feed material 2310 may be comprised of one or more healthy meats. Further, the one or more healthy meats may include a chicken, a pork, a beef, etc.

Further, in some embodiments, the apparatus 2300 may be comprised of the natural rubber.

Further, in some embodiments, the elongated body 2302 may include an insulator disposed around the interior cavity 2308. Further, the insulator slows a temperature rise of the at least one feed material 2310 received in the interior cavity 2308 of the elongated body 2302.

Further, in some embodiments, the apparatus 2300 may include at least one fragrance material element 2402, at least one first fragrance material element 2404, and a masking element 2406. Further, the at least one fragrance material element 2402 releases at least one appetizing fragrance. Further, the at least one first fragrance material element 2404 releases at least one non-appetizing fragrance. Further, the at least one appetizing fragrance attracts the at least one pet to the apparatus 2300. Further, the at least one non-appetizing fragrance repels the at least one pet from the apparatus 2300. Further, the masking element 2406 may be configured to be transitionable between a first state and a second state. Further, the masking element 2406 prevents releasing of the at least one appetizing fragrance and allows releasing of the at least one non-appetizing fragrance in the first state. Further, the masking element 2406 prevents releasing of the at least one non-appetizing fragrance and allows releasing of the at least one appetizing fragrance in the second state.

Further, in an embodiment, the apparatus 2300 may include a sensor 2408, a processing device 2410, and an actuator 2412. Further, the sensor 2408 may be disposed on the elongated body 2302. Further, the sensor 2408 may be configured for generating at least one sensor data based on detecting an amount of the at least one feed material 2310 present in the interior cavity 2308. Further, the processing device 2410 may be communicatively coupled with the sensor 2408. Further, the processing device 2410 may be configured for analyzing the at least one sensor data. Further, the processing device 2410 may be configured for determining an emptiness of the interior cavity 2308 of the elongated body 2302 based on the analyzing of the elongated body 2302. Further, the processing device 2410 may be configured for generating at least one command based on the determining. Further, the actuator 2412 may be disposed on the elongated body 2302. Further, the actuator 2412 may be communicatively coupled with the processing device 2410. Further, the actuator 2412 may be operatively coupled with the masking element 2406. Further, the actuator 2412 may be configured for transitioning the masking element 2406 from the second state to the first state based on the command.

Figure 25:
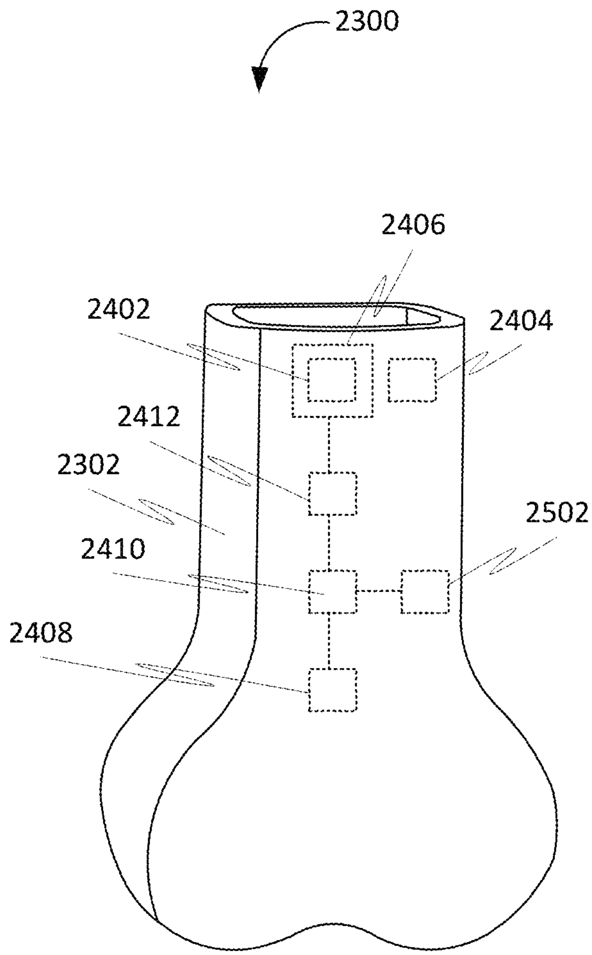
FIG. 25 is a front view of the apparatus 2300, in accordance with some embodiments.

Further, in an embodiment, the processing device 2410 may be configured for generating at least one notification associated with the amount of the at least one feed material 2310 based on the determining. Further, the apparatus 2300 may include a communication device 2502, as shown in FIG. 25, communicatively coupled with the processing device 2410. Further, the communication device 2502 may be configured for transmitting the at least one notification to at least one user device associated with the at least one user. Further, the at least one user device may include a smartphone, a laptop, a tablet, a desktop, a smartwatch, etc.

Further, the at least one user may include an individual, an organization, an institution, etc.

Figure 26:
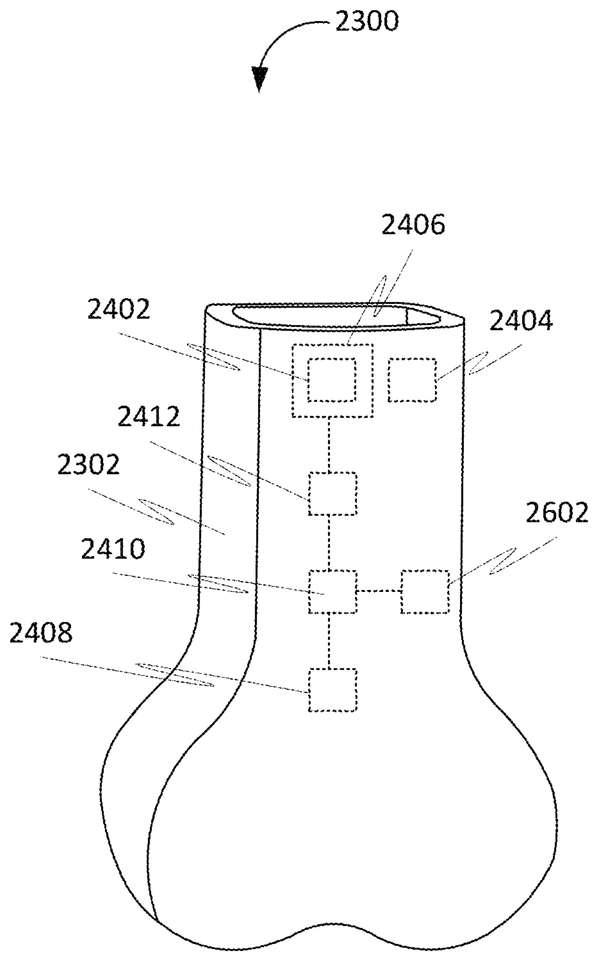
FIG. 26 is a front view of the apparatus 2300, in accordance with some embodiments.

Further, in some embodiments, the apparatus 2300 may include at least one location sensor 2602, as shown in FIG. 26. Further, the at least one location sensor 2602 may be configured for generating at least one apparatus location data of the apparatus 2300 based on detecting a location of the apparatus 2300. Further, the communication device 2502 may be configured for receiving at least one user location data associated with the at least one user from at least one first location sensor comprised in the at least one user device. Further, the processing device 2410 may be communicatively coupled with the at least one location sensor 2602. Further, the processing device 2410 may be configured for analyzing the at least one apparatus location data and the at least one user location data based on the determining of the emptiness. Further, the processing device 2410 may be configured for generating a navigational map for the at least one user to navigate to the apparatus 2300 based on the analyzing of the at least one apparatus location data and the at least one user location data. Further, the communication device 2502 may be configured for transmitting the navigational map to the at least one user device.

Further, in some embodiments, different size of elongated bodies may include different size of interior cavities. Further, different size of pets may use the different size of elongated bodies.

Figure 24:
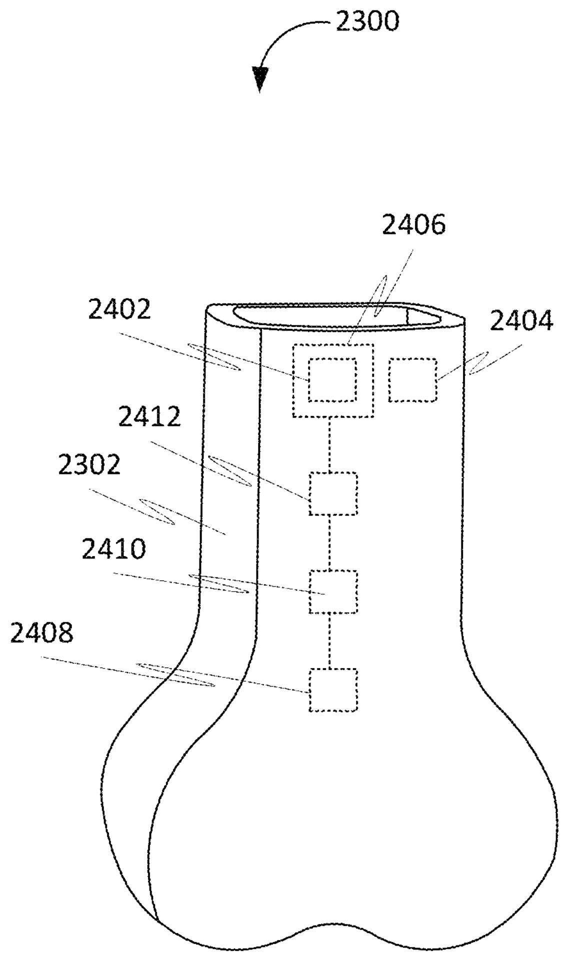
FIG. 24 is a front view of the apparatus 2300, in accordance with some embodiments.

FIG. 24 is a front view of the apparatus 2300, in accordance with some embodiments.

FIG. 25 is a front view of the apparatus 2300, in accordance with some embodiments.

FIG. 26 is a front view of the apparatus 2300, in accordance with some embodiments.

Figure 27:
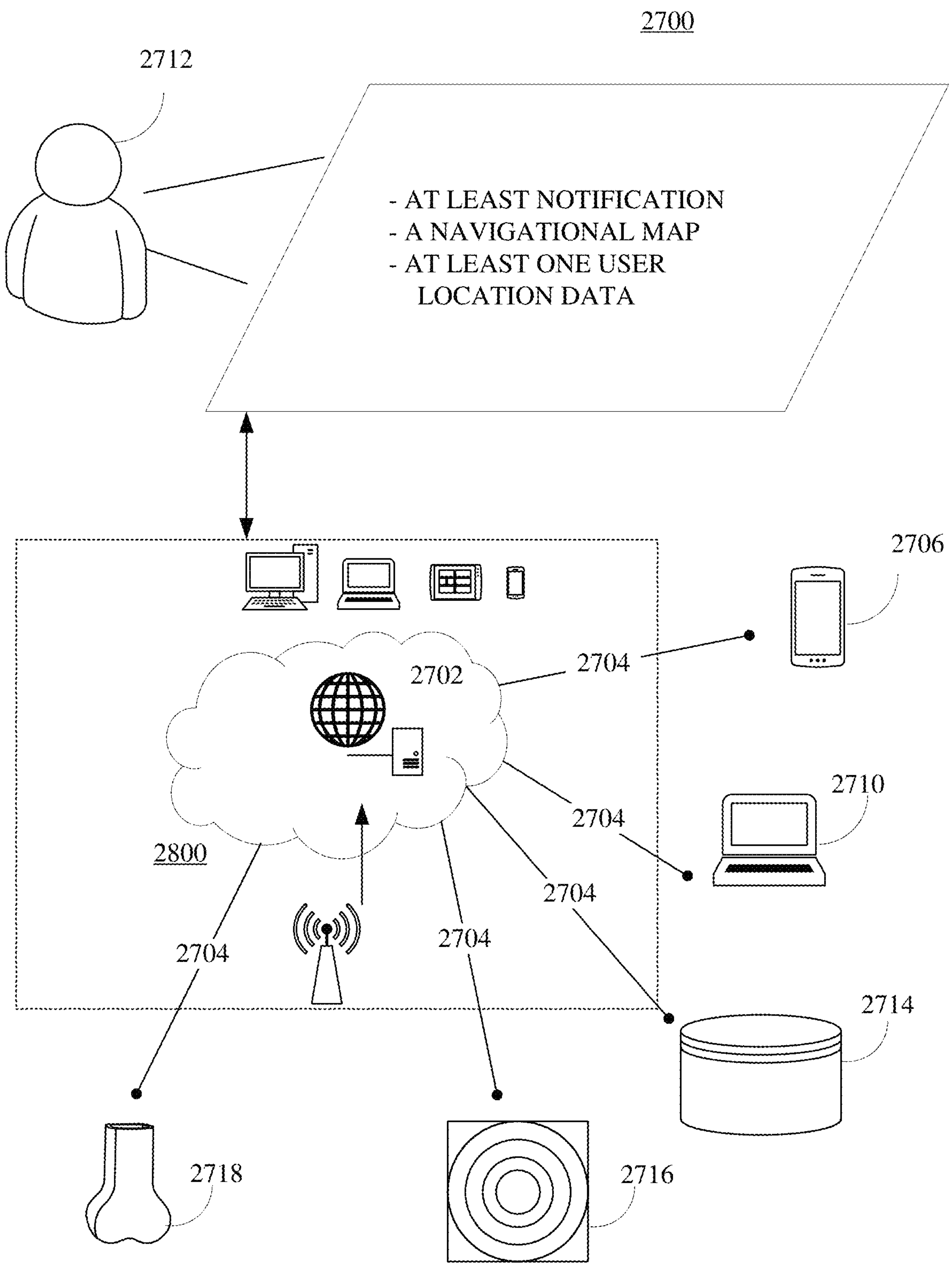
FIG. 27 is an illustration of an online platform consistent with various embodiments of the present disclosure.

FIG. 27 is an illustration of an online platform 2700 consistent with various embodiments of the present disclosure. By way of non-limiting example, the online platform 2700 to facilitate feeding of animals may be hosted on a centralized server 2702, such as, for example, a cloud computing service. The centralized server 2702 may communicate with other network entities, such as, for example, a mobile device 2706 (such as a smartphone, a laptop, a tablet computer etc.), other electronic devices 2710 (such as desktop computers, server computers etc.), databases 2714, sensors 2716, and an apparatus 2718 (such as the apparatus 100, the apparatus 2000, the apparatus 2100, the apparatus 2300, etc) over a communication network 2704, such as, but not limited to, the Internet. Further, users of the online platform 2700 may include relevant parties such as, but not limited to, end-users, administrators, service providers, service consumers and so on. Accordingly, in some instances, electronic devices operated by the one or more relevant parties may be in communication with the platform.

A user 2712, such as the one or more relevant parties, may access online platform 2700 through a web based software application or browser. The web based software application may be embodied as, for example, but not be limited to, a website, a web application, a desktop application, and a mobile application compatible with a computing device 2800.

Figure 28:
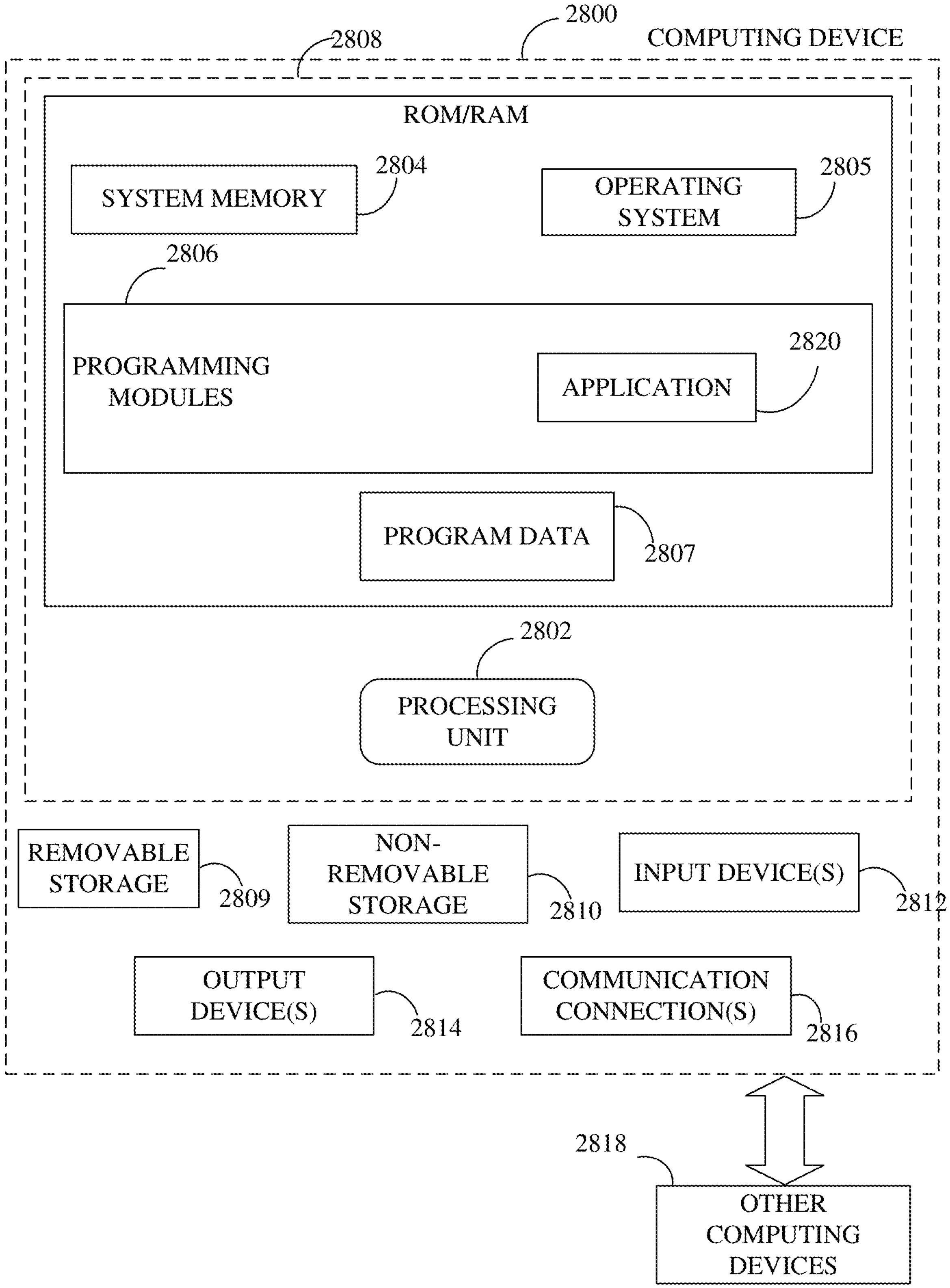
FIG. 28 is a block diagram of a computing device for implementing the methods disclosed herein, in accordance with some embodiments.

With reference to FIG. 28, a system consistent with an embodiment of the disclosure may include a computing device or cloud service, such as computing device 2800. In a basic configuration, computing device 2800 may include at least one processing unit 2802 and a system memory 2804. Depending on the configuration and type of computing device, system memory 2804 may comprise, but is not limited to, volatile (e.g. random-access memory (RAM)), non-volatile (e.g. read-only memory (ROM)), flash memory, or any combination. System memory 2804 may include operating system 2805, one or more programming modules 2806, and may include a program data 2807. Operating system 2805, for example, may be suitable for controlling computing device 2800's operation. In one embodiment, programming modules 2806 may include image-processing module, machine learning module. Furthermore, embodiments of the disclosure may be practiced in conjunction with a graphics library, other operating systems, or any other application program and is not limited to any particular application or system. This basic configuration is illustrated in FIG. 28 by those components within a dashed line 2808.

Computing device 2800 may have additional features or functionality. For example, computing device 2800 may also include additional data storage devices (removable and/or non-removable) such as, for example, magnetic disks, optical disks, or tape. Such additional storage is illustrated in FIG. 28 by a removable storage 2809 and a non-removable storage 2810. Computer storage media may include volatile and non-volatile, removable and non-removable media implemented in any method or technology for storage of information, such as computer-readable instructions, data structures, program modules, or other data. System memory 2804, removable storage 2809, and non-removable storage 2810 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 2800. Any such computer storage media may be part of device 2800. Computing device 2800 may also have input device(s) 2812 such as a keyboard, a mouse, a pen, a sound input device, a touch input device, a location sensor, a camera, a biometric sensor, etc. Output device(s) 2814 such as a display, speakers, a printer, etc. may also be included. The aforementioned devices are examples and others may be used.

Computing device 2800 may also contain a communication connection 2816 that may allow device 2800 to communicate with other computing devices 2818, such as over a network in a distributed computing environment, for example, an intranet or the Internet. Communication connection 2816 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 2804, including operating system 2805. While executing on processing unit 2802, programming modules 2806 (e.g., application 2820 such as a media player) may perform processes including, for example, one or more stages of methods, algorithms, systems, applications, servers, databases as described above. The aforementioned process is an example, and processing unit 2802 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Examples of one or more client devices and/or server computers and/or computing devices may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer and/or the computing device may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer and/or the computing device may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer and/or the computing device may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data finger-printing, role based access control, and so on.

Although the present disclosure has been explained in relation to its preferred embodiment, it is to be understood that many other possible modifications and variations can be made without departing from the spirit and scope of the disclosure.

What is claimed is:

1. An apparatus for facilitating feeding of animals, wherein the apparatus comprises a body having a top side and a bottom side opposing the top side, wherein the body comprises at least one interior space and at least one opening leading into the at least one interior space, wherein the at least one opening is disposed on the top side of the body, wherein the at least one interior space is configured to be fillable with at least one feed material by transferring the at least one fillable material into the at least one interior space through the at least one opening, wherein the body is comprised of at least one material, wherein the body comprises at least one exterior surface and a layer of heat conducting material attached to at least a portion of the at least one exterior surface, wherein a heat conductivity of the heat conducting material is higher than the at least one material, wherein the body further comprises a layer of heat insulating material attached to at least a portion of the at least one exterior surface, wherein a heat conductivity of the heat insulating material is lower than the at least one material, wherein the body is configured for:

enhancing heat transfer from the at least one feed material filled in the at least one interior space to an exterior of the apparatus for freezing the at least one feed material, based on the layer of the heat conducting material, wherein the body is configured to be stably disposed on a surface for serving the at least one feed material to at least one animal after the freezing of the at least one feed material;

restricting heat transfer to the at least one feed material filled in the at least one interior space from the exterior of the apparatus, based on the layer of the heat insulating material; and allowing a consumption of the at least one feed material based on licking of the at least one feed material by the at least one animal through the at least one opening for facilitating the feeding of the at least one animal.

2. The apparatus of claim 1, wherein the at least one opening is characterized by at least one opening size, wherein the at least one opening size is substantially equal to at least one tongue size of the at least one animal, wherein the allowing of the consumption of the at least one feed material based on the licking of the at least one feed material by the at least one animal through the at least one opening is based on the at least one opening size of the at least one opening.

3. The apparatus of claim 1, wherein the body comprises at least one interior surface defining the at least one interior space and a layer of non stick material on the at least one interior surface.

4. The apparatus of claim 1, wherein the body comprises at least one interior surface defining the at least one interior space and at least one protrusion extending from the at least one interior surface in the at least one interior space, wherein the enhancing of the heat transfer from the at least one feed material is based on the at least one protrusion.

5. The apparatus of claim 1, wherein the layer of the heat conducting material is removably attached to at least the portion of the at least one exterior surface.

6. The apparatus of claim 1, wherein the layer of the heat insulating material is removably attached to at least the portion of the at least one exterior surface.

7. The apparatus of claim 1, wherein the body comprises a bottom surface comprised on the bottom side of the body, wherein the bottom surface is a flat surface, wherein the bottom surface contacts the surface for stably disposing the apparatus on the surface.

8. The apparatus of claim 1, wherein the at least one material is elastically flexible.

9. The apparatus of claim 1, wherein the body comprises at least one internal cavity, wherein the at least one internal cavity is filled with at least one liquid, wherein a thermal conductivity of the at least one liquid is greater than the at least one material, wherein the enhancing of the heat transfer from the at least one feed material is further based on the at least one liquid.

10. The apparatus of claim 9, wherein the body comprises at least one cavity opening leading into the at least one internal cavity and at least one cavity lid coupled with the at least one cavity opening, wherein the at least one cavity lid is configured for transitioning the at least one cavity opening between an open state and a closed state for openably closing the at least one cavity opening, wherein the at least one cavity opening allows receiving of the at least one liquid in the at least one internal cavity through the at least one cavity opening in the open state, wherein the at least one cavity opening restricts discharging of the at least one liquid from the at least one internal cavity in the closed state.

11. The apparatus of claim 10, wherein the at least one cavity opening allows discharging of the at least one liquid filled in the at least one internal cavity, through the at least one cavity opening in the open state, wherein the at least one internal cavity is filled with air after the discharging of the at least one liquid filled in the at least one internal cavity, through the at least one cavity opening in the open state, wherein the at least one cavity opening restricts discharging of the air filled in the at least one internal cavity in the closed state, wherein a thermal conductivity of the air is less than the at least one material, wherein the restricting of the heat transfer to the at least one feed material is based on the air.

12. The apparatus of claim 1, wherein the body comprises at least one weighted element of at least one weight, wherein the at least one weighted element locates a center of mass of the body after the filling of the at least one interior space with the at least one feed material in a first location in the body, wherein the center of mass moves to a second location in the body based on a tilting of the body with respect to a vertical axis of the body, wherein a height of the first location of the center of mass is lower than a height of the second location of the center of mass from a bottom end of the body, wherein the stably disposing of the body on the surface is based on the at least one weighted element.

13. The apparatus of claim 1, wherein the body comprises an elongated portion and a lobe portion, wherein the elongated portion extends between a first end and a second end, wherein the lobe is attached to the second end, wherein the at least one interior space is comprised in the elongated portion, wherein the at least one opening is comprised on the elongated portion at the first end.

14. The apparatus of claim 1, wherein the body comprises an elongated portion and two lobes, wherein the elongated portion extends between a first end and a second end, wherein a first lobe of the two lobes is attached to the first end and a second lobe of the two lobes is attached to the second end, wherein the at least one interior space comprises two interior spaces, wherein a first interior space of the two interior spaces is comprised in the first lobe and a second interior space of the two interior spaces is comprised in the second lobe, wherein the at least one opening comprises two openings, wherein a first opening of the two openings is comprised in the first lobe and a second opening of the two openings is comprised in the second lobe.

15. The apparatus of claim 1, wherein the allowing of the consumption of the at least one feed material comprises allowing a consumption of the at least one feed material portionably based on the licking of a portion of one or more portions of the at least one feed material, wherein the at least one opening exposes the portion of the one or more portions of the at least one feed material to the licking of the at least one animal through the at least one opening, wherein the licking of the portion of the one or more portions of the at least one feed material through the at least one opening raises a temperature of the portion of the one or more portions of the at least one feed material from a frozen temperature to a consumable temperature for the allowing of the consumption of the at least one feed material portionably based on the licking of the portion of the one or more portions of the at least one feed material.

16. An apparatus for facilitating feeding of animals, wherein the apparatus comprises a body having a top side and a bottom side opposing the top side, wherein the body comprises at least one interior space and at least one opening leading into the at least one interior space, wherein the at least one opening is disposed on the top side of the body, wherein the at least one interior space is configured to be fillable with at least one feed material by transferring the at least one fillable material into the at least one interior space through the at least one opening, wherein the body is comprised of at least one material, wherein the body comprises at least one exterior surface and a layer of heat conducting material attached to at least a portion of the at least one exterior surface, wherein a heat conductivity of the heat conducting material is higher than the at least one material, wherein the body further comprises a layer of heat insulating material attached to at least a portion of the at least one exterior surface, wherein a heat conductivity of the heat insulating material is lower than the at least one material, wherein the body is configured for:

enhancing heat transfer from the at least one feed material filled in the at least one interior space to an exterior of the apparatus for freezing the at least one feed material, based on the layer of the heat conducting material, wherein the body is configured to be stably disposed on a surface for serving the at least one feed material to at least one animal after the freezing of the at least one feed material;

restricting heat transfer to the at least one feed material filled in the at least one interior space from the exterior of the apparatus, based on the layer of the heat insulating material; and allowing a consumption of the at least one feed material based on licking of the at least one feed material by the at least one animal through the at least one opening for facilitating the feeding of the at least one animal, wherein the body comprises an elongated portion and two lobes, wherein the elongated portion extends between a first end and a second end, wherein a first lobe of the two lobes is attached to the first end and a second lobe of the two lobes is attached to the second end, wherein the at least one interior space comprises two interior spaces, wherein a first interior space of the two interior spaces is comprised in the first lobe and a second interior space of the two interior spaces is comprised in the second lobe, wherein the at least one opening comprises two openings, wherein a first opening of the two openings is comprised in the first lobe and a second opening of the two openings is comprised in the second lobe.

17. The apparatus of claim 16, wherein the body comprises at least one weighted element of at least one weight, wherein the at least one weighted element locates a center of mass of the body after the filling of the at least one interior space with the at least one feed material in a first location in the body, wherein the center of mass moves to a second location in the body based on a tilting of the body with respect to a vertical axis of the body, wherein a height of the first location of the center of mass is lower than a height of the second location of the center of mass from a bottom end of the body, wherein the stably disposing of the body on the surface is based on the at least one weighted element.

18. An apparatus for facilitating feeding of animals, wherein the apparatus comprises a body having a top side and a bottom side opposing the top side, wherein the body comprises at least one interior space and at least one opening leading into the at least one interior space, wherein the at least one opening is disposed on the top side of the body, wherein the at least one interior space is configured to be fillable with at least one feed material by transferring the at least one fillable material into the at least one interior space through the at least one opening, wherein the body is comprised of at least one material, wherein the body comprises at least one exterior surface and a layer of heat conducting material attached to at least a portion of the at least one exterior surface, wherein a heat conductivity of the heat conducting material is higher than the at least one material, wherein the body further comprises a layer of heat insulating material attached to at least a portion of the at least one exterior surface, wherein a heat conductivity of the heat insulating material is lower than the at least one material, wherein the body is configured for:

enhancing heat transfer from the at least one feed material filled in the at least one interior space to an exterior of the apparatus for freezing the at least one feed material, based on the layer of the heat conducting material, wherein the body is configured to be stably disposed on a surface for serving the at least one feed material to at least one animal after the freezing of the at least one feed material, wherein the body comprises a bottom surface comprised on the bottom side of the body, wherein the bottom surface is a flat surface, wherein the bottom surface contacts the surface for stably disposing the apparatus on the surface;

restricting heat transfer to the at least one feed material filled in the at least one interior space from the exterior of the apparatus, based on the layer of the heat insulating material; and allowing a consumption of the at least one feed material based on licking of the at least one feed material by the at least one animal through the at least one opening for facilitating the feeding of the at least one animal.

* * * * *